United States Patent
Dixon et al.

(10) Patent No.: US 11,698,327 B2
(45) Date of Patent: *Jul. 11, 2023

(54) FLUID SAMPLING SYSTEM

(71) Applicant: Swagelok Company, Solon, OH (US)

(72) Inventors: Matthew Dixon, Parma, OH (US); Eric M. Kvarda, Mentor, OH (US)

(73) Assignee: Swagelok Company, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,028

(22) Filed: Jan. 4, 2022

(65) Prior Publication Data

US 2022/0120643 A1 Apr. 21, 2022

Related U.S. Application Data

(63) Continuation of application No. 16/830,493, filed on Mar. 26, 2020, now Pat. No. 11,243,144.

(60) Provisional application No. 62/826,244, filed on Mar. 29, 2019.

(51) Int. Cl.
*G01N 1/10* (2006.01)

(52) U.S. Cl.
CPC ....... *G01N 1/10* (2013.01); *G01N 2001/1062* (2013.01)

(58) Field of Classification Search
CPC ............. G01N 1/10; G01N 2001/1062; G01N 1/4022; G01N 2001/4027; G01N 2001/2071; G01N 1/2035

USPC .......... 73/53.01, 61.43, 61.44, 61.59, 64.56, 73/863.11, 863.12, 866; 141/94, 98, 192, 141/198

See application file for complete search history.

(56) References Cited

U.S. PATENT DOCUMENTS

| | | | |
|---|---|---|---|
| 6,423,548 B1 | 7/2002 | Newberg et al. | |
| 2014/0208873 A1 | 7/2014 | Klentzman | |

FOREIGN PATENT DOCUMENTS

| | | | | |
|---|---|---|---|---|
| CN | 207036869 | * | 2/2018 | ............. A24B 15/24 |
| EP | 1106990 | | 6/2001 | |
| WO | WO-2010057621 A2 | * | 5/2010 | ................ A01J 5/01 |

OTHER PUBLICATIONS

International Search Report and Written Opinion from PCT/US2020/024829 dated Aug. 27, 2020.

(Continued)

*Primary Examiner* — Robert R Raevis
(74) *Attorney, Agent, or Firm* — Calfee, Halter & Griswold LLP

(57) ABSTRACT

A residue tube assembly includes a residue tube having an open upper end and a cap assembly including a cap sealingly secured with the open upper end and an adjustable member assembled with the cap and defining an outlet passage extending into the residue tube to define a fill limit of the residue tube, and an overflow passage extending radially outward and downward of the open upper end of the residue tube. The adjustable member is vertically adjustable in the cap to adjust the fill limit of the residue tube.

17 Claims, 22 Drawing Sheets

(56) References Cited

OTHER PUBLICATIONS

CGA G-2.2: Guideline Method for Determining Minimum 0.2% Water in Anhydrous Ammonia, 49 CFR 173.315(1)(5), Second Addition, 15 pgs. 1997.
Assembly Concept 43404—shown-offered for sale prior to Mar. 29, 2018—3 pgs.
Assembly Concept 36802—shown-offered for sale prior to Mar. 29, 2018—3 pgs.
Assembly Concept 39670—shown-offered for sale prior to Mar. 29, 2018—2 pgs.

* cited by examiner

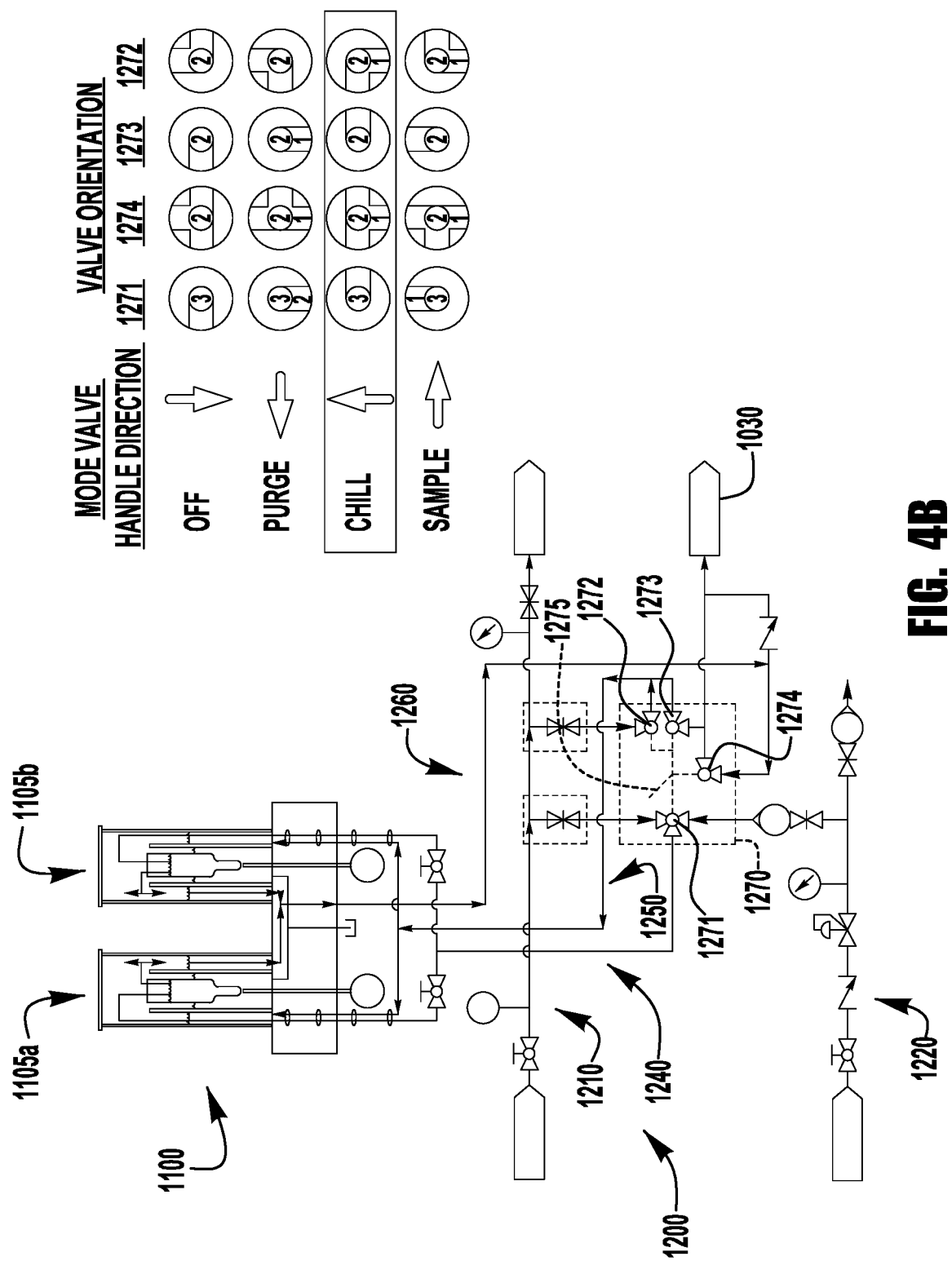

FLUID SAMPLING SYSTEM

CROSS-REFERENCE TO RELATED APPLICATION

This application is a continuation of U.S. Ser. No. 16/830,493, filed on Mar. 26, 2020, entitled FLUID SAMPLING SYSTEM which claims priority to and all benefits of U.S. Provisional Patent Application Ser. No. 62/826,244, filed on Mar. 29, 2019, entitled AMMONIA SAMPLING SYSTEM, the entire disclosures of which are incorporated herein by reference.

TECHNICAL FIELD

The present disclosure relates to fluid sampling systems. More particularly, the disclosure relates to sampling systems for fluids having low boiling temperatures, such as ammonia.

BACKGROUND

Ammonia has many uses, including, for example, industrial cleaners and fertilizers. While ammonia is a gas at room temperature and atmospheric pressure, commercial ammonia is commonly shipped in liquid form, under pressure and/or at low temperatures. Because ammonia has a tendency to cause stress corrosion cracking in steel cargo tanks absent a minimal water content, the Department of Transportation (DOT) has promulgated regulations requiring a minimum water content of 0.2% by weight for ammonia shipped in DOT specification MC-330/MC-331 cargo tanks constructed of quenched and tempered steel (QT) and requiring periodic analyses for the prescribed water content in the ammonia.

CGA specification G-2.2 provides guidelines for determining the water content in ammonia. In the system described in G-2.2, as shown in FIG. 1, a regulated flow of liquid ammonia is drawn through an inlet tube 11, past a stopper 12 into a glass residue tube 10 (having a wider upper body portion 10a and a narrower, graduated lower stem portion 10b) before sealing the inlet tube 11. The ammonia in the residue tube 10 is allowed to evaporate or boil off at a temperature of up to 120° F. (49° C.), leaving the unevaporated liquid water content of the ammonia sample in the graduated lower stem portion 10b of the residue tube, for visual inspection of the water content. The percent water by weight in the ammonia sample is calculated using the measured water residue in the graduated lower stem portion, multiplied by an evaporation factor (EF) calculated based on the temperature and pressure of the sampled ammonia.

The high pressure and/or low temperature conditions required to maintain the ammonia in a liquid state make sampling difficult, as the ammonia can be vulnerable to inadvertent flashing to gaseous form during preparation of the same, thereby affecting the accuracy of any water content measurements. Further, user handling of, or other interaction with, the ammonia can create safety hazards, causing irritation or caustic burns if inhaled or in contact with an individual's skin.

SUMMARY OF THE DISCLOSURE

In accordance with an exemplary aspect of one or more of the inventions presented in this disclosure, a residue tube assembly includes a residue tube having an open upper end and a cap assembly including a cap sealingly secured with the open upper end and an adjustable member assembled with the cap and defining an outlet passage extending into the residue tube to define a fill limit of the residue tube, and an overflow passage extending radially outward and downward of the open upper end of the residue tube. The adjustable member is vertically adjustable in the cap to adjust the fill limit of the residue tube.

In accordance with another exemplary aspect of one or more of the inventions presented in this disclosure, a sampling container assembly includes a residue tube having an open upper end, an inner pipe surrounding the residue tube to define an inner cavity for receiving a heat transfer fluid, and a cap assembly including a cap sealingly secured with the open upper end of the residue tube, an outlet passage extending into the residue tube to define a fill limit of the residue tube, and an overflow passage extending radially outward and downward of open upper end of the residue tube. The cap assembly includes an overhang portion that extends over an upper end of the inner pipe.

In accordance with another exemplary aspect of one or more of the inventions presented in this disclosure, a sampling container assembly includes a residue tube having an open upper end, an inner pipe surrounding the residue tube to define an inner cavity for receiving a heat transfer fluid, an outer pipe surrounding the inner pipe to define an outer annulus, and a cap assembly including a cap sealingly secured with the open upper end of the residue tube, an outlet passage extending into the residue tube to define a fill limit of the residue tube, and an overflow passage extending radially outward and downward of the open upper end of the residue tube, into the outer annulus between the inner pipe and the outer pipe.

BRIEF DESCRIPTION OF THE DRAWINGS

FIG. 4B is a schematic view of the sampling system of FIG. 3, shown in a cold bath filling condition;

DESCRIPTION OF THE EXEMPLARY EMBODIMENTS

Figure 1:
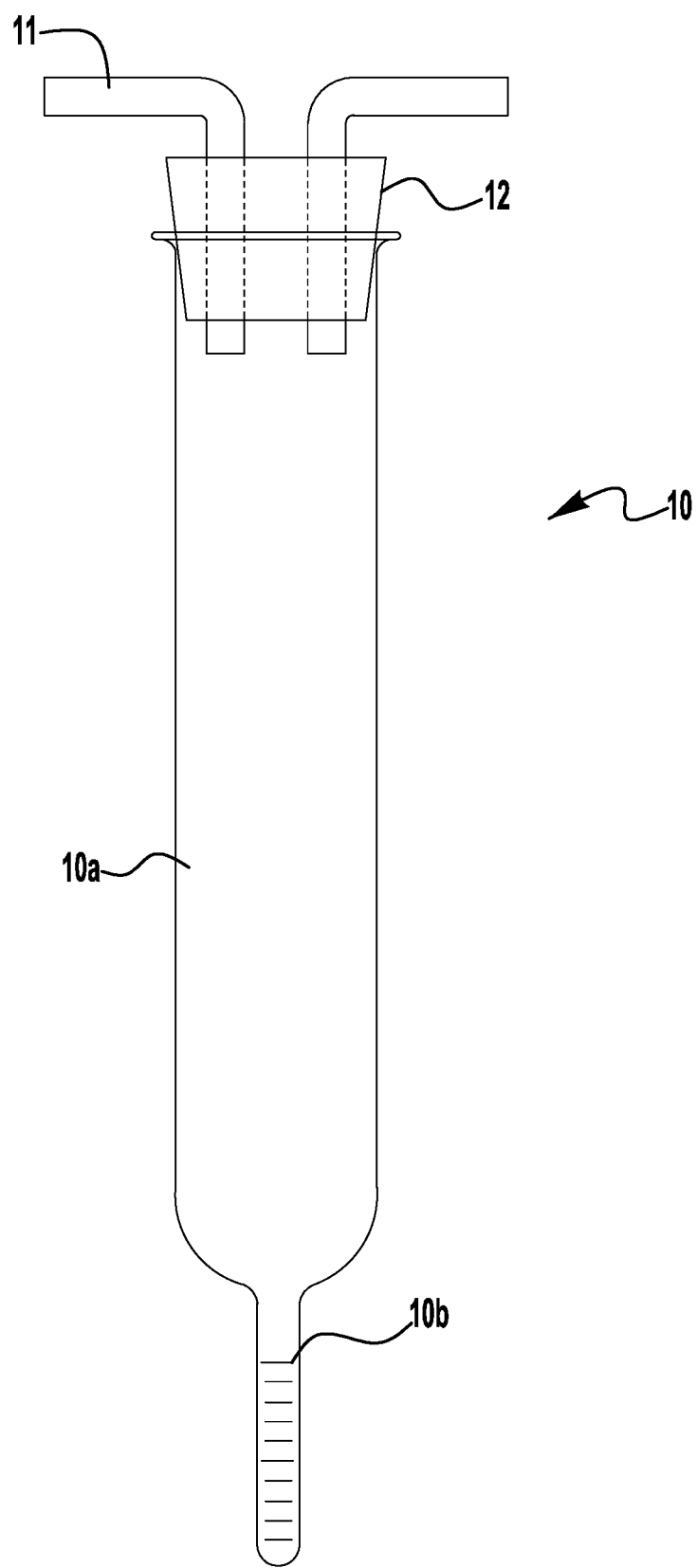
FIG. 1 is a schematic view of a conventional ammonia sampling arrangement in accordance with CGA G-2.2 guidelines.

This Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while the specific embodiments described herein relate to systems for sampling liquid ammonia and analyzing such samples for water content, the features of the present disclosure may additionally or alternatively be applied to other types of fluid sampling, processing, and containment systems, including systems for sampling other types of fluid and systems for analyzing sampled fluids for other fluid properties.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Figure 2:
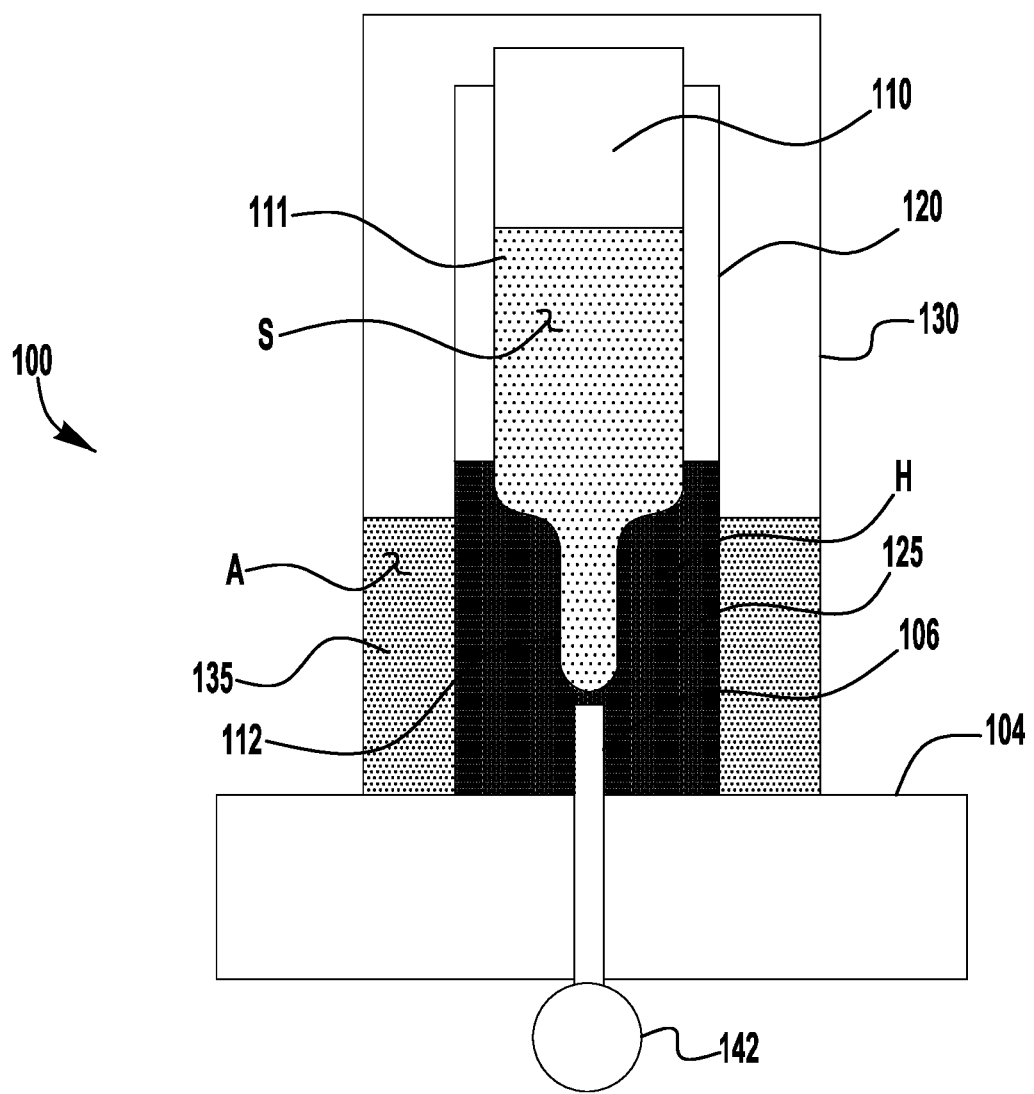
FIG. 2 is a schematic view of a sampling fixture, in accordance with an exemplary embodiment of the present disclosure.

FIG. 2 schematically illustrates an exemplary fixture 100 for an ammonia sampling system, in which a sample receiving residue tube 110, having a wider upper body portion 111 and a narrower, graduated lower stem portion 112, is received in and surrounded by an inner pipe 120, which is received in and surrounded by an outer pipe 130. A heat transfer fluid H (e.g., glycol) is deposited in the inner pipe 120 in an inner cavity 125 between the residue tube 110 and the inner pipe 120. An outer annulus 135 between the inner pipe 120 and the outer pipe 130 is filled with liquid ammonia A to cool the heat transfer fluid and the residue tube 110. The cooled residue tube 110 is filled with an ammonia sample S, and a heater 104 (e.g., an aluminum heater block) beneath the residue tube 110 and inner and outer pipes 120, 130 is powered to warm the heat transfer fluid and evaporate the ammonia (both the sample S in the residue tube and the cooling ammonia bath A in the outer annulus 135). When the ammonia sample S has fully evaporated, the remaining water content in the graduated lower stem portion 112 of the residue tube 110 can be visually inspected and measured. The heater 104 may be controlled by a temperature switch 142 actuated by a container temperature probe 106 extending into the inner pipe 120 proximate the lower stem portion 112 of the residue tube 110.

According to an exemplary aspect of the present application, a sampling system may be provided with a fluid distribution subassembly for controlled introduction, drainage, and purging of sample fluids and thermal control fluids into the sampling system, for example, to eliminate reliance on manual filling of samples and thermal fluids, and the risk of inconsistency and/or spillage that may result from such methods. In one such system, ammonia (both for sampling and for the cooling bath) and a purge gas (e.g., nitrogen) are supplied to a container subassembly of a sampling fixture from a fluid distribution subassembly from below a container mounting fixture block of the sampling fixture, with the fluids supplied through the fixture block and into a bottom end of the container subassembly. In one such embodiment, the ammonia in the cooling bath may be permitted to drain during testing of the ammonia sample, to reduce the amount of heating required to evaporate the ammonia sample.

Figure 3:
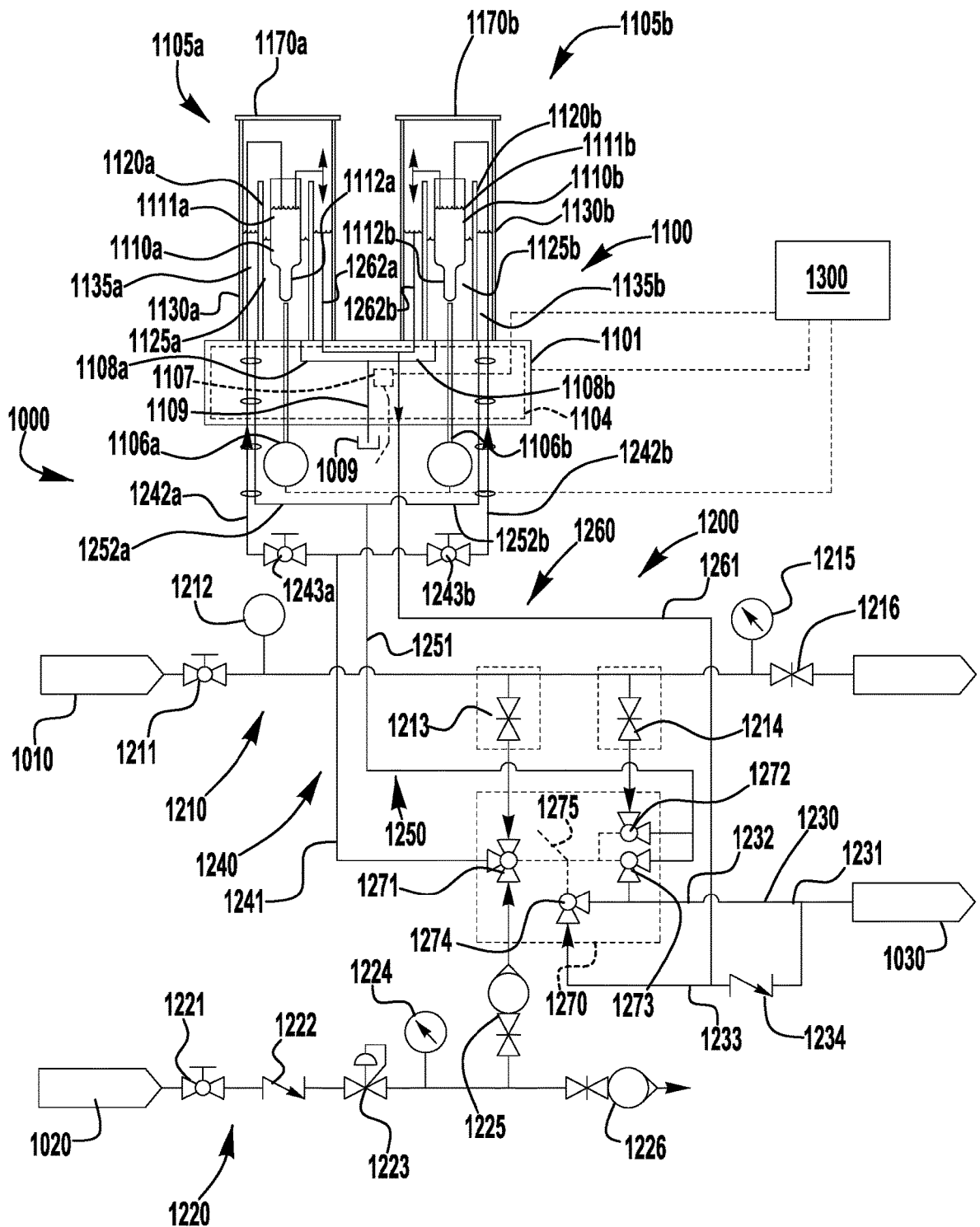
FIG. 3 is a schematic view of a sampling system, in accordance with an exemplary embodiment of the present disclosure.

FIG. 3 schematically illustrates an exemplary ammonia sampling system 1000 including a sampling fixture 1100 in fluid communication with a fluid distribution system 1200. The sampling fixture 1100 includes first and second sample container subassemblies 1105a-b, for simultaneous testing of two separate ammonia samples. In other exemplary embodiments, a different number of sample container subassemblies may be provided (e.g., one subassembly, or three or more subassemblies).

Each sample container subassembly 1105a-b includes a sample receiving residue tube 1110a-b, having a wider upper body portion 1111a-b and a narrower, graduated lower stem portion 1112a-b, an inner pipe 1120a-b sealingly mounted to the fixture block 1101 and surrounding the residue tube to define an inner cavity 1125a-b, and an outer pipe 1130a-b sealingly mounted to the fixture block and surrounding the inner pipe to define an outer annulus 1135a-b. Container caps 1170a-b are assembled with, and seal against, the upper ends of the outer pipes 1130a-b.

The fixture block 1101 is thermally connected to an aluminum heater block 1104 electrically connected to a controller 1300 and operable to heat the fixture block, for heating the heat transfer fluid in the inner cavity 1125a-b. A fixture block temperature probe 1107 is disposed within the fixture block 1101 and electrically connected to the controller 1300 to provide a signal indicating the temperature of the fixture block, for accurate controlled heating of the fixture block to a desired temperature (e.g. about 140° F. or 60° C.). A container temperature probe 1106a-b (e.g., resistance temperature detector or RTD) is installed through the fixture block 1101 to extend into the inner cavity 1125a-b to measure the temperature of the heat transfer fluid. The container temperature probe 1106a-b is electrically connected with the controller 1300, for measurement of the temperature of the heat transfer fluid, to a desired temperature for controlled evaporation of the ammonia sample (e.g., about 120° F. or 49° C.). Drain passages 1108a-b may be provided in the fixture block 1101 to drain the heat transfer fluid from the inner cavities 1125a-b to a drain port 1109 (e.g., for maintenance and/or period replacement of the fluid), which may be provided with a removable plug 1009 for selective drainage. Alternatively (not shown), a valve may be connected to the drain port for selective drainage of the heat transfer fluid.

The fluid distribution system 1200 includes an ammonia supply line 1210 for supplying ammonia from an ammonia supply 1010 (e.g., tank) to the sampling fixture 1100, a purge gas supply line 1220 for supplying purge gas (e.g., nitrogen) to the sampling fixture, a drain line 1230 for draining fluid from the containers, a residue tube line 1240 for supplying ammonia and purge gas to the residue tubes, a cold bath line 1250 for supplying ammonia to, and draining ammonia and purge gas from, the outer annuli 1135a-b, and an overflow line 1260 for draining excess ammonia from the outer annuli.

The ammonia supply line 1210 may be configured to continuously recirculate ammonia in the supply line to the ammonia supply 1010 to provide for quicker sampling of the fluid (i.e., a "fast loop" arrangement), and to maintain the valves and conduits in a chilled condition. As shown, the ammonia supply line 1210 may include a shutoff valve 1211, a temperature indicator 1212, first and second branch valves 1213, 1214, a pressure gauge 1215, and a regulating valve 1216. The shutoff valve 1211 provides for isolation of the system from the ammonia supply, for example, to facilitate system maintenance. The branch valves 1213, 1214 provide for selective and independent flow control to each of the residue tubes and the cold baths, respectively. The regulating valve 1216 may be operated to reduce flow and increase pressure, for example, to ensure the ammonia remains in a liquid state.

The purge gas supply line 1220 may be configured to direct purge gas from a purge gas supply 1020 (e.g., tank) to an enclosure purge, for example, to purge stray vapors from the enclosure (both the control enclosure and sampling enclosure) to the surrounding atmosphere. As shown, the purge gas supply line 1220 may include a shutoff valve 1221, a check valve 1222, a pressure regulator 1223, a pressure gauge 1224, a supply regulating valve 1225, and a purge regulating valve 1226. The shutoff valve 1221 provides for isolation of the system from the purge gas supply, for example, to facilitate system maintenance. The check valve 1222 prevents backflow in the purge gas supply line, and the pressure regulator 1223 reduces the purge gas pressure to an appropriate pressure for purging the system (e.g., 10 psig), as monitored by the pressure gauge 1224. The supply and purge regulating valves 1225, 1226 may be provided with flowmeters to facilitate regulation of the purge gas.

The drain line 1230 includes a drain conduit 1231 extending to a drain 1030, an open drain branch 1232 permitting free flow to the drain conduit, and a relief drain branch 1233 permitting pressurized flow to the drain conduit (as limited by a low pressure check valve 1234) for draining fluid from the cold bath line 1250 and the overflow line 1260, as discussed in greater detail below.

The residue tube line 1240 is connected to the ammonia supply line 1210 and to the purge gas supply line 1220 by a residue tube supply valve 1271 operable to open the residue tube line to a selected one of the ammonia supply line and the purge gas supply line. The residue tube line 1240 includes a source conduit 1241 and branch supply conduits 1242a-b each extending through the fixture block 1101 and outer annulus 1135a-b for connection with the residue tube 1110a-b through inlet ports 1192a-b in a sealed cap subassembly 1180a-b on each residue tube, to supply ammonia or purge gas (e.g., nitrogen) to the residue tubes. As shown, shutoff valves 1243a-b may be provided with each of the branch conduits 1242a-b to shut off ammonia flow to a selected one of the residue tubes, for example, in the event only one sample is desired.

The cold bath line 1250 is connected to the ammonia supply line 1210 by a cold bath supply valve 1272 operable to open the cold bath line to the ammonia supply line. The cold bath line 1250 includes a source conduit 1251 and branch conduits 1252a-b extending through the fixture block 1101 and into the outer annulus 1135a-b to supply ammonia to the outer annulus (thereby providing a cold bath surrounding the heat transfer fluid in the inner cavity). The cold bath line 1250 is connected to the open drain branch 1232 of the drain line 1230 by a cold bath drain valve 1273 operable (in combination with the closing of the cold bath supply valve 1272) to drain ammonia and purge gas from the outer annulus 1135a-b.

The overflow line 1260 is connected to the relief drain branch 1233 of the drain line 1230 for draining ammonia overflow from the outer annulus 1135a-b. The overflow line includes a main conduit 1261 and branch conduits 1262a-b each extending into the outer annulus 1135a-b. The overflow line branch conduits 1262a-b may be arranged to terminate at a height selected to limit the volume of the cold bath, with excess ammonia added to the outer annulus draining through the branch conduits to the main conduit 1261, and to the relief drain branch 1233 of the drain line 1230. An overflow drain valve 1274 may be positioned between the relief drain branch 1233 and the open drain branch 1232 and may be selectively closed to block flow from the open drain branch to the overflow line 1260, thereby preventing drain backflow to the overflow line, for example, when the system is inactive.

In an exemplary operation of the sampling system 1000, the residue tube supply valve 1271, cold bath supply valve 1272, cold bath drain valve 1273, and overflow drain valve 1274 (collectively the "system switching valves") may be collectively operated to place the system in a selected one of an inactive ("OFF") condition, a cold bath filling ("CHILL") condition, a sample filling ("SAMPLE") condition, and a system purging ("PURGE") condition.

Figure 4A:
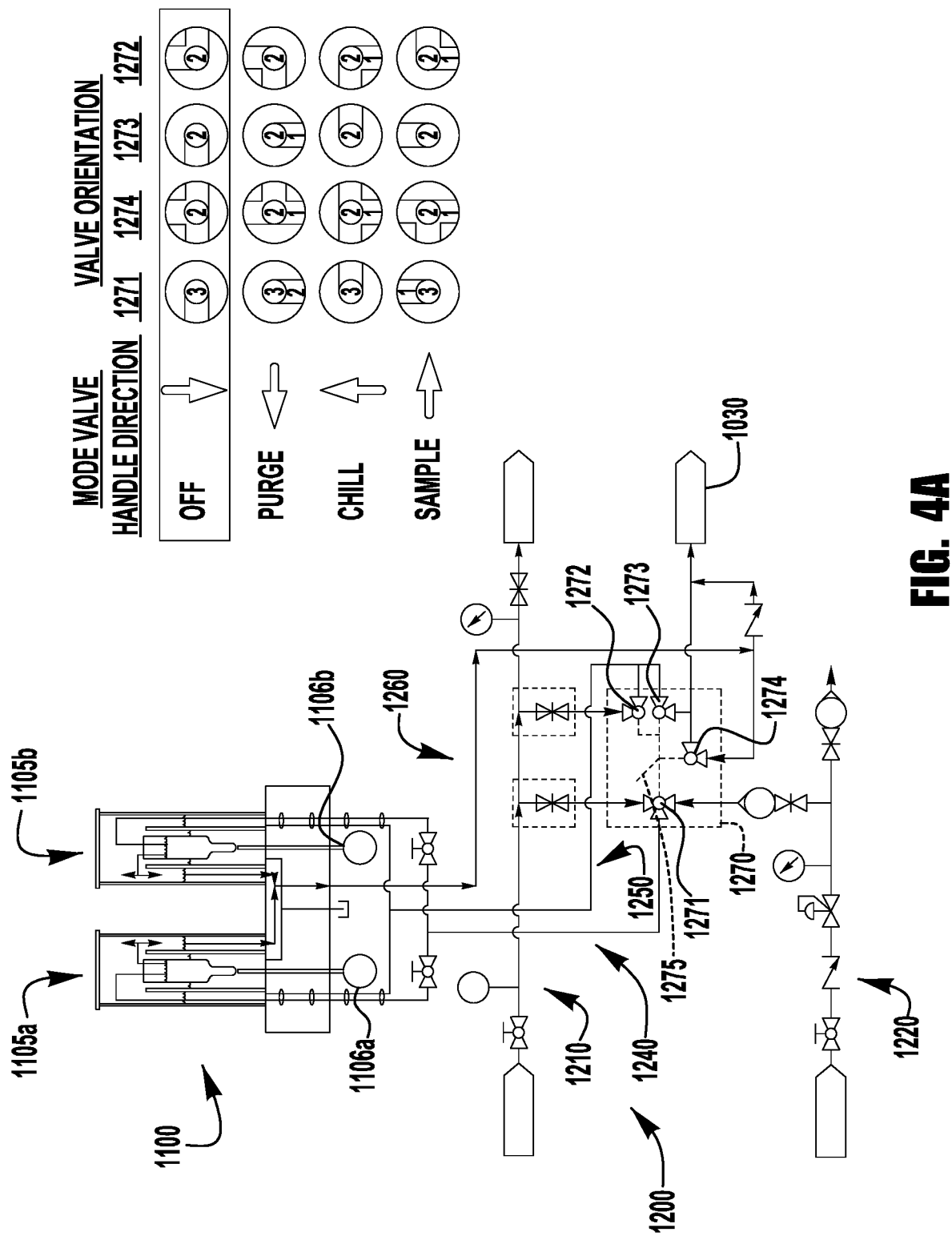
FIG. 4A is a schematic view of the sampling system of FIG. 3, shown in an inactive condition.

In the inactive ("OFF") condition, as shown in FIG. 4A: the residue tube supply valve 1271 is in the closed position to shut off flow from the ammonia and purge gas supply lines 1210, 1220 to the residue tube line 1240; the cold bath supply valve 1272 is in the closed position to shut off flow from the ammonia supply line 1210 to the cold bath line 1250; the cold bath drain valve 1273 is in the closed position to prevent back pressure from the drain 1030 into the cold bath line; and the overflow drain valve 1274 is in the closed position to prevent back pressure from the drain into the overflow line 1260. This valve arrangement may be maintained when the sampling system is not in use.

In the cold bath filling ("CHILL") condition, as shown in FIG. 4B: the residue tube supply valve 1271 is in the closed position to shut off flow from the ammonia and purge gas supply lines 1210, 1220 to the residue tube line 1240; the cold bath supply valve 1272 is in the open position to permit flow from the ammonia supply line 1210 to the cold bath line 1250; the cold bath drain valve 1273 is in the closed position to prevent flow from the ammonia supply line 1210 to the drain 1030; and the overflow drain valve 1274 is in the open position to permit cold bath overflow to drain from the overflow line 1260 to the drain 1030. This valve arrangement is utilized when the cold bath (outer annulus) is being filled and may be maintained (with excess ammonia passing through the overflow line) until the container temperature probe 1106*a-b* indicates that the heat transfer fluid is at a desired temperature for receiving the sample.

Figure 4C:
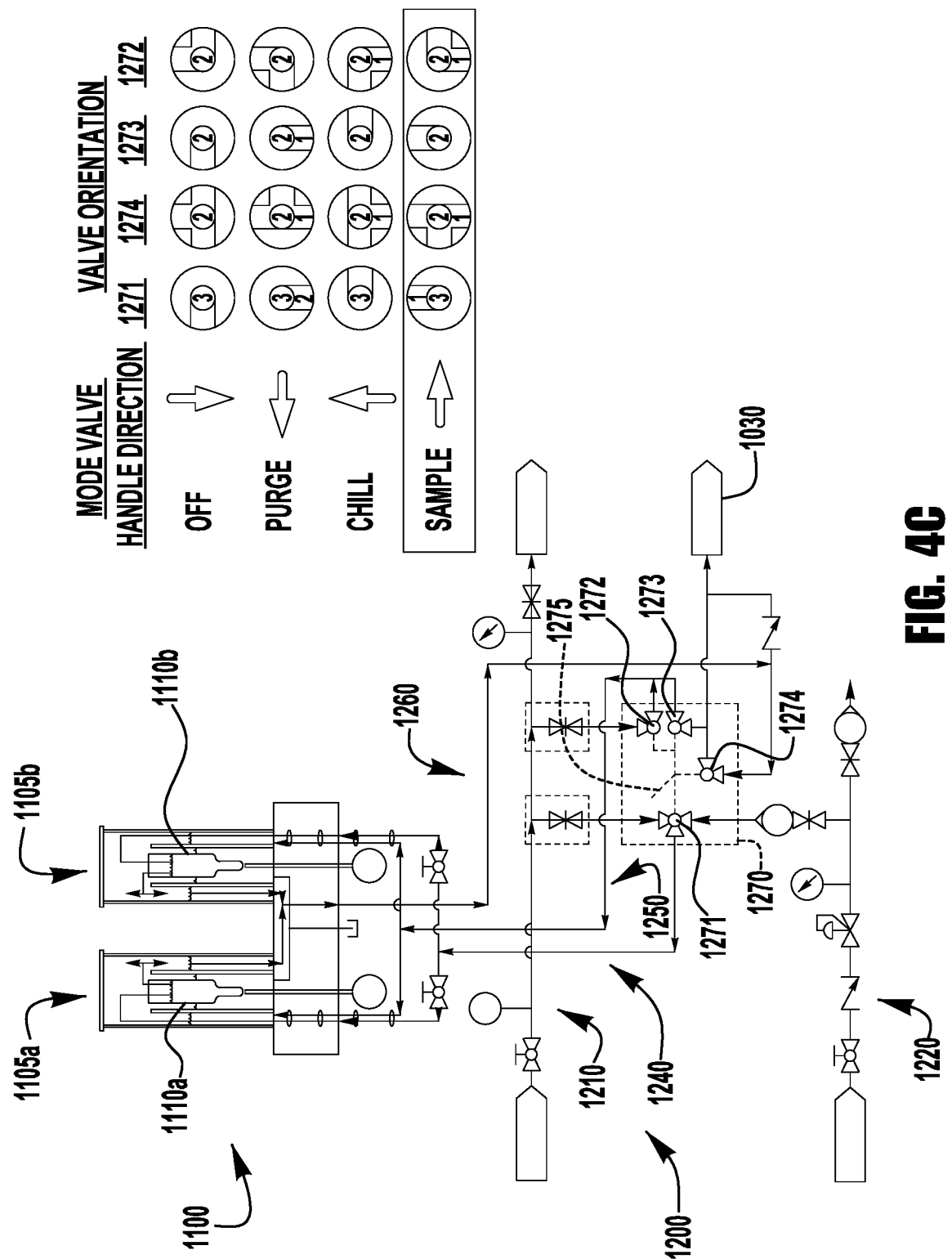
FIG. 4C is a schematic view of the sampling system of FIG. 3, shown in a sample filling condition.

In the sample filling ("SAMPLE") condition, as shown in FIG. 4C: the residue tube supply valve 1271 is in a first switching position permitting flow between the ammonia supply line 1210 and the residue tube line 1240; the cold bath supply valve 1272 is in the open position to supply ammonia from the ammonia supply line 1210 to the cold bath line 1250 to supply new liquid ammonia to the cold bath for continued cooling of the heat transfer fluid, which cools the sample; the cold bath drain valve 1273 is in the closed position to retain cooling ammonia; and the overflow drain valve 1274 is in the open position to permit cold bath overflow to drain from the overflow line 1260 to the drain. This valve arrangement is utilized as the sample is being collected in the residue tube 1110*a-b*, until the supplied sample has reached a desired fill line in the upper body portion 1111*a-b* of the residue tube and begins spilling into the cold bath.

Figure 4D:
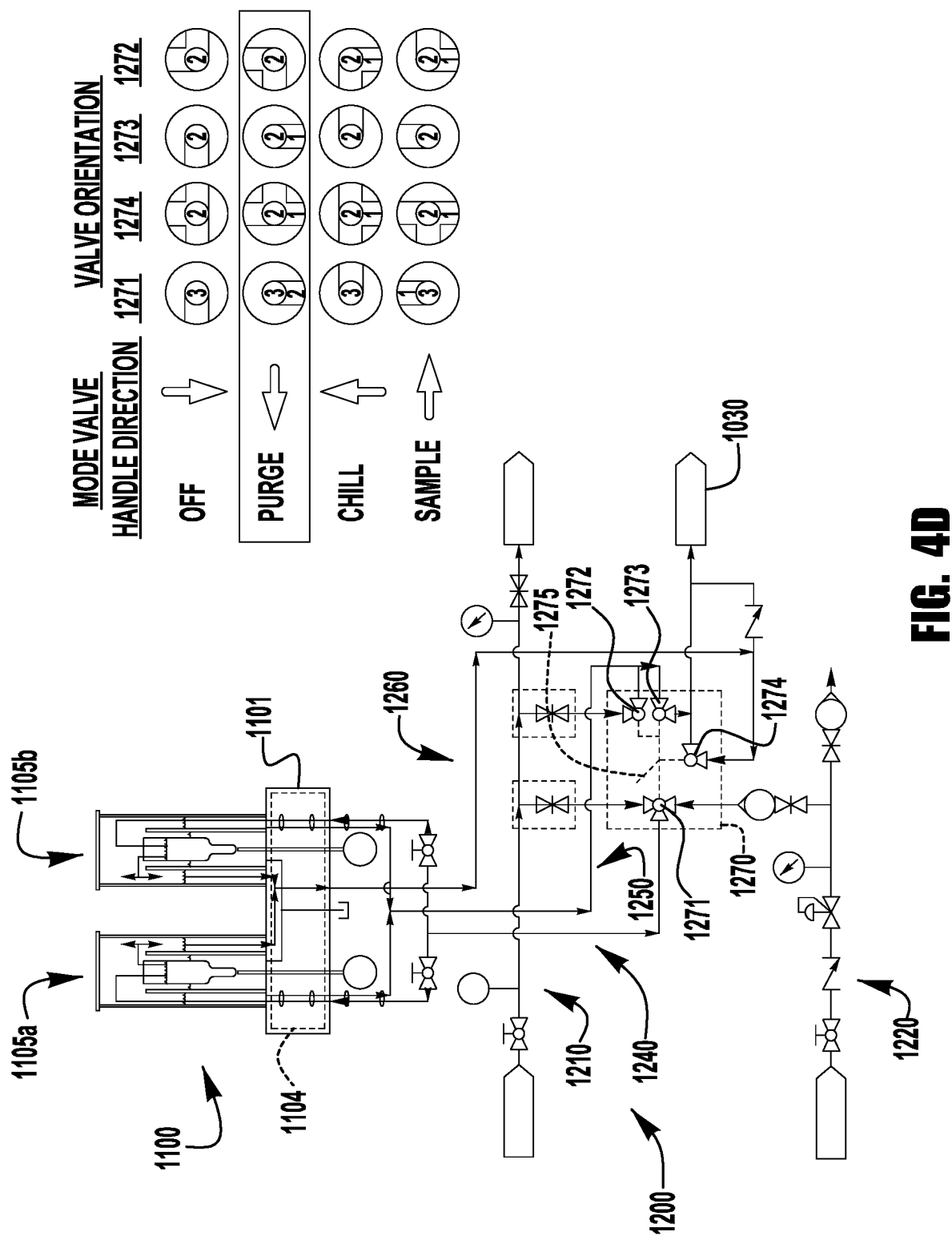
FIG. 4D is a schematic view of the sampling system of FIG. 3, shown in a system purging condition.

In the system purging ("PURGE") condition, as shown in FIG. 4D: the residue tube supply valve 1271 is in a second switching position permitting flow between the purge gas supply line 1220 and the residue tube line 1240; the cold bath supply valve 1272 is in the closed position to shut off flow from the ammonia supply line 1210 to the cold bath line 1250; the cold bath drain valve 1273 is in the open position to permit ammonia in the outer annulus to drain through the cold bath line 1250 to the drain; and the overflow drain valve 1274 is in the open position to permit purge gas and purged fluids to evacuate from the container through the overflow line 1260 to the drain. This valve arrangement is utilized as the heat transfer fluid is heated by the heater block 1104 (through the fixture block 1101), allowing the cold bath to drain for more efficient evaporation of the ammonia sample, and may be maintained until the ammonia has fully evaporated, at which time the valve arrangement may be actuated to the inactive condition.

The system switching valves 1271, 1272, 1273, 1274 may each be independently operated by a user between the positions corresponding to the system maintaining, cold bath filling, sample filling, and system purging conditions, as described above. According to another aspect of the present disclosure, as schematically shown in FIGS. 3 and 4A-4D, the system 1000 may include a valve arrangement 1270 in which a single handle or other such actuator 1275 may be operated for simultaneous actuation of the system switching valves 1271, 1272, 1273, 1274, such as, for example, a single manual or electromechanical operation. In one such exemplary embodiment, as described in greater detail below, the single actuator may include a manually rotatable handle and a gear mechanism configured to operate all four valves, with a first position of the handle corresponding to the system maintaining condition, a second position of the handle corresponding to a cold bath filling condition, a third position of the handle corresponding to a sample filling condition, and a fourth position of the handle corresponding to a system purging condition.

Many different suitable sampling systems may be provided in accordance with one or more of the exemplary features of the sampling system 1000 schematically illustrated in FIGS. 3-4D. FIGS. 5-17 illustrates various views of an exemplary ammonia sampling system 2000 including several features in accordance with exemplary aspects of the present disclosure. In the exemplary system 2000, an ammonia sampling fixture 2100 and fluid distribution system 2200 are enclosed within an outer box or cabinet 2050, for example, to protect and support the various components of the system. The sampling fixture 2100 includes first and second sample container subassemblies 2105*a-b* mounted to and supported by a fixture block 2101, for simultaneous testing of two separate ammonia samples. In other exemplary embodiments, a different number of sample container subassemblies may be provided (e.g., one subassembly, or three or more subassemblies).

Figure 6:
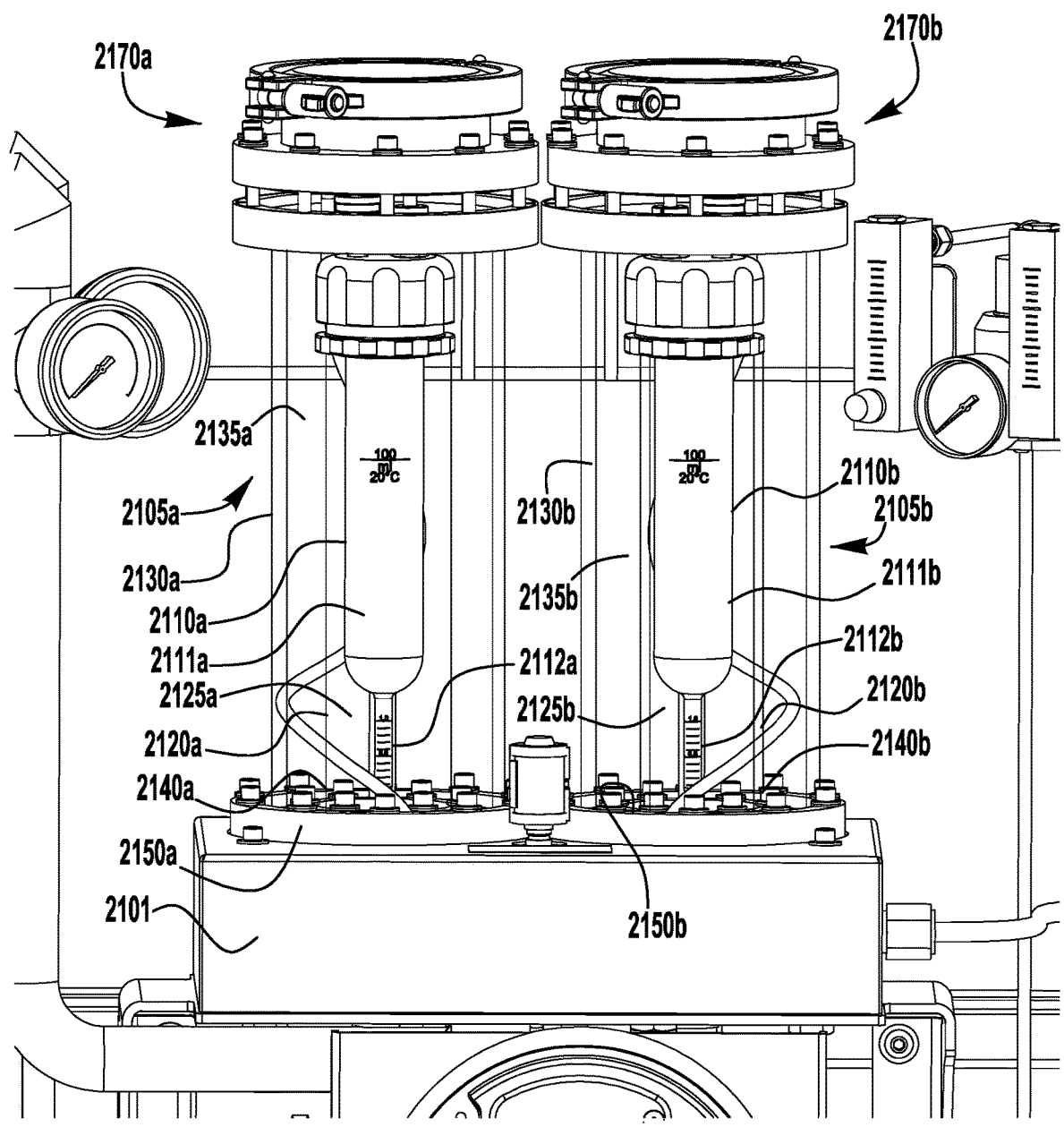
FIG. 6 is an enlarged front view of a sampling fixture portion of the sampling system of FIG. 5.

As shown in FIG. 6, each sample container subassembly 2105*a-b* includes a sample receiving residue tube 2110*a-b*, having a wider upper body portion 2111*a-b* and a narrower, graduated lower stem portion 2112*a-b*, an inner pipe 2120*a-b* sealingly mounted to the fixture block 2101 by inner mounting arrangements 2140*a-b* and surrounding the residue tube to define an inner cavity 2125*a-b* for retaining a heat transfer fluid (e.g., glycol), and an outer pipe 2130*a-b* sealingly mounted to the fixture block by outer mounting arrangements 2150*a-b* and surrounding the inner pipe to define an outer annulus 2135*a-b* for receiving and retaining an ammonia cold bath. Container cap subassemblies 2170*a-b* are assembled with, and seal against, the upper ends of the outer pipes 2130*a-b*.

Figure 7:
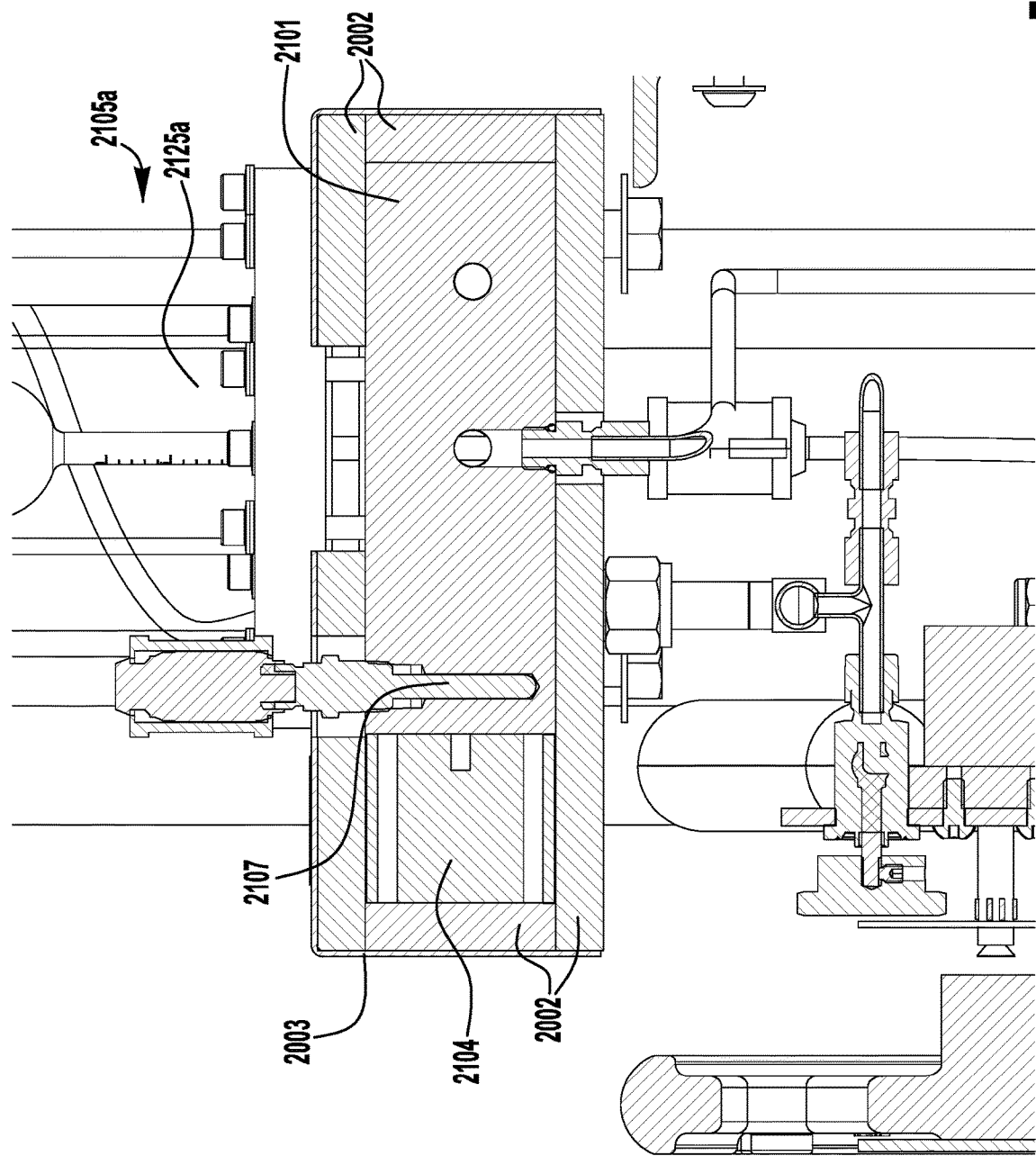
FIG. 7 is a side cross-sectional view of a fixture block portion of the sampling system of FIG. 5.

As shown in FIG. 7, the fixture block 2101 is thermally connected to an aluminum heater block 2104 electrically connected to a controller 2300 (shown in FIGS. 5 and 9 and described in greater detail below) and operable to heat the fixture block, for heating the heat transfer fluid in the inner cavity 2125*a-b*. A fixture block temperature probe 2107 is disposed within the fixture block 2101 and may be electrically connected to the controller 2300 to provide a signal indicating the temperature of the fixture block, for accurate controlled heating of the fixture block to a desired temperature (e.g. about 140° F. or 60° C.). Insulation material 2002 (e.g., a Buna/PVC closed cell foam) may be applied over the heater block 2104 and fixture block 2101 to prevent heat loss to the atmosphere, and a cover 2003 (e.g., stainless steel cover) may be fitted over the insulation material, for example, to neatly contain the insulation. The cover 2003 may be attached to the fixture block 2101, for example, using nylon bolts.

Figure 8:
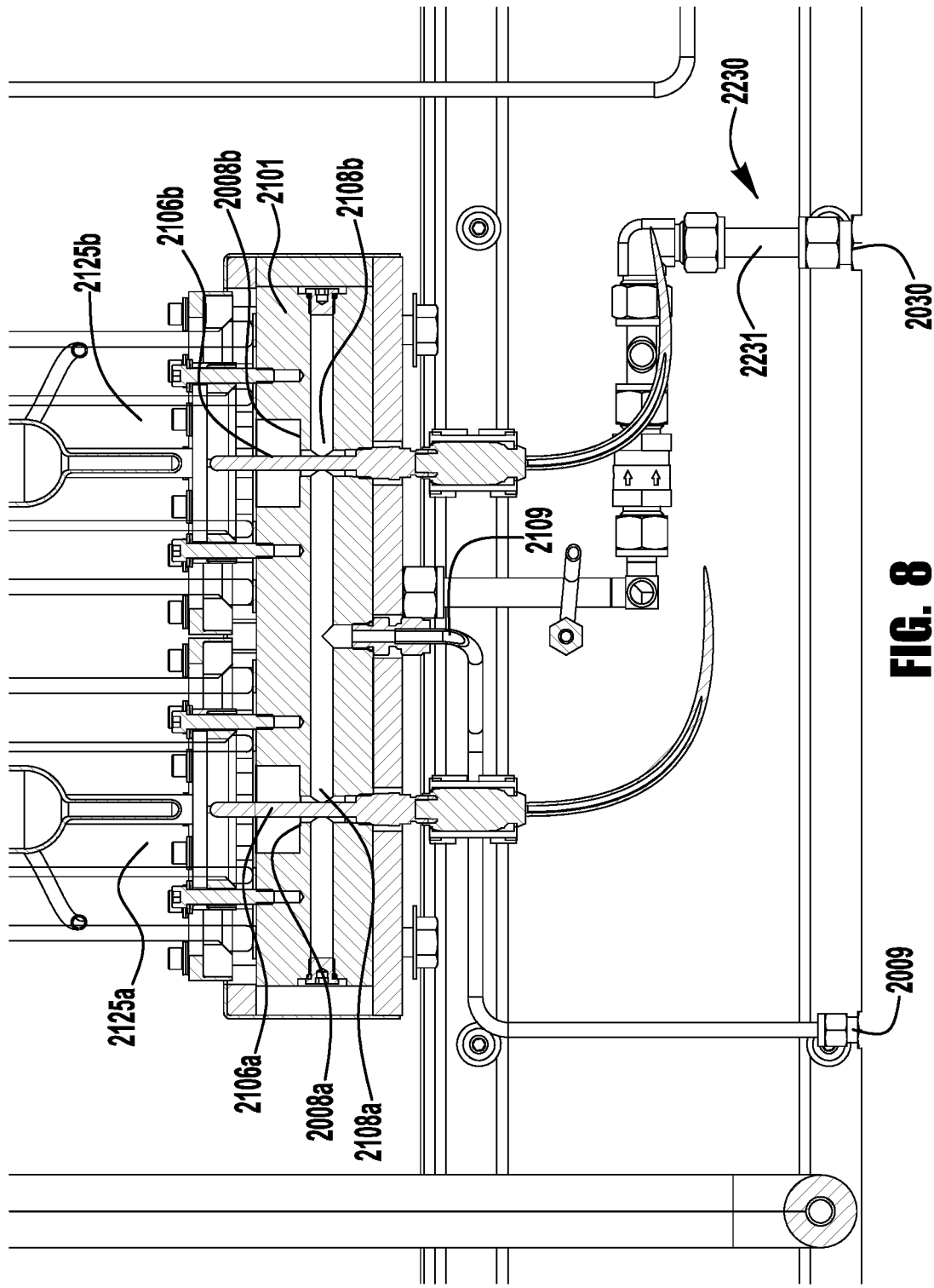
FIG. 8 is a partial rear cross-sectional view of the sampling system of FIG. 5, illustrating features of the fixture block.

As shown in FIG. 8, a container temperature probe 2106*a-b* is installed through the fixture block 2101 to extend into the inner cavity 2125*a-b* to sense the temperature of the heat transfer fluid. The container temperature probe 2106*a-b* may be electrically connected with the controller 2300, which is configured to selectively power the heater block 2104 to achieve a desired temperature of the heat transfer fluid, as measured by the temperature probe, for controlled evaporation of the ammonia sample. Drain passages 2108*a-b* may be provided in the fixture block 2101 to drain the heat transfer fluid from the inner cavities 2125*a-b* to a drain conduit 2109 (e.g., for maintenance and/or period replacement of the fluid), which may be provided with a removable plug 2009 for selective drainage. In the illustrated example, the container temperature probe 2106*a-b* is installed through the drain passage 2108*a-b*. As shown, a counterbore 2008*a-b* may be provided in the fixture block, surrounding the drain passage, to provide a lower well in the inner cavity 2125*a-b*, for example, to increase surface exposure of the fixture block 2101 to the heat transfer fluid, and/or to reduce the height of the inner cavity 2125*a-b*.

Figure 5:
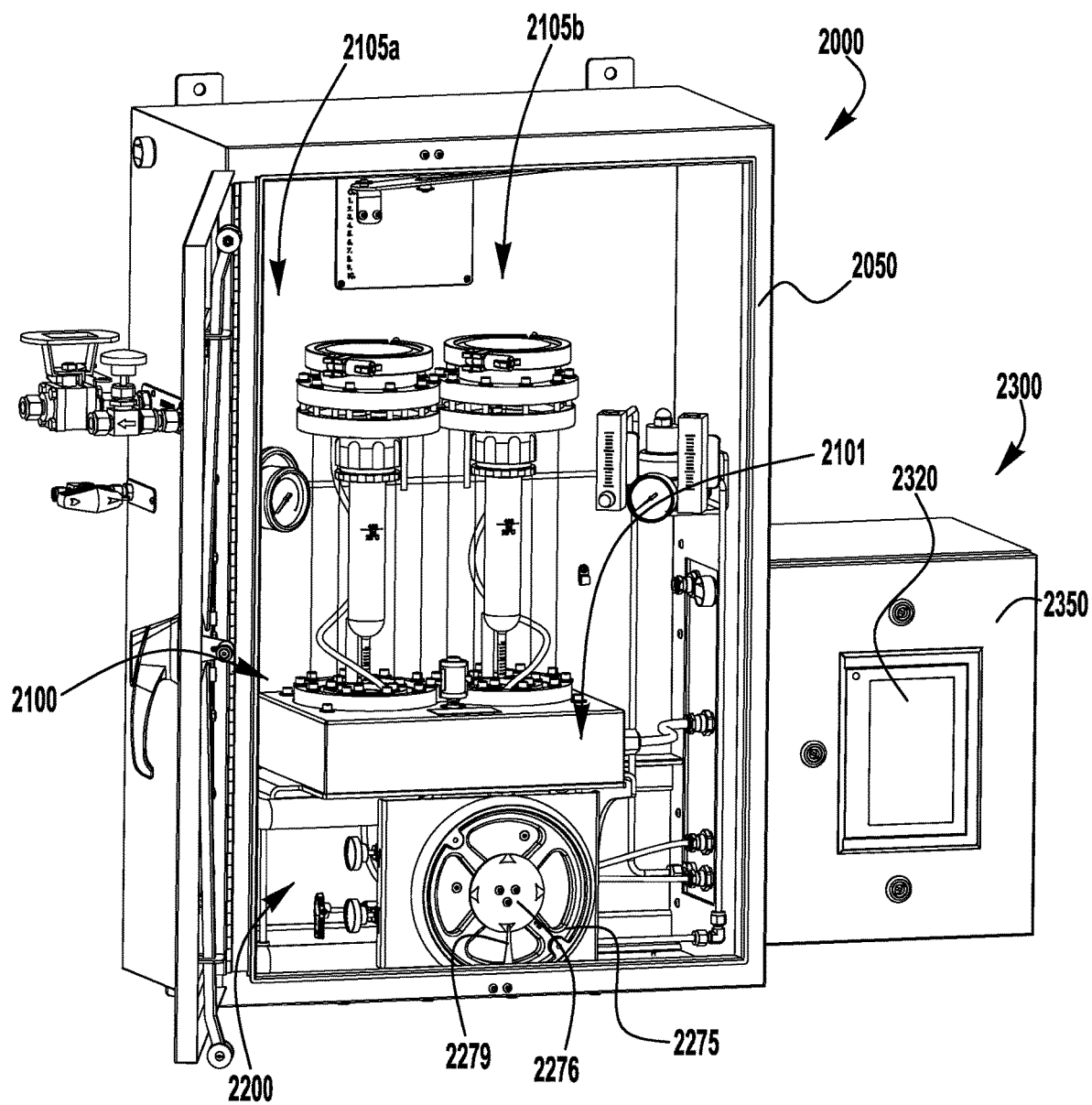
FIG. 5 is a perspective view of a sampling system, in accordance with an exemplary embodiment of the present disclosure.
Figure 9:
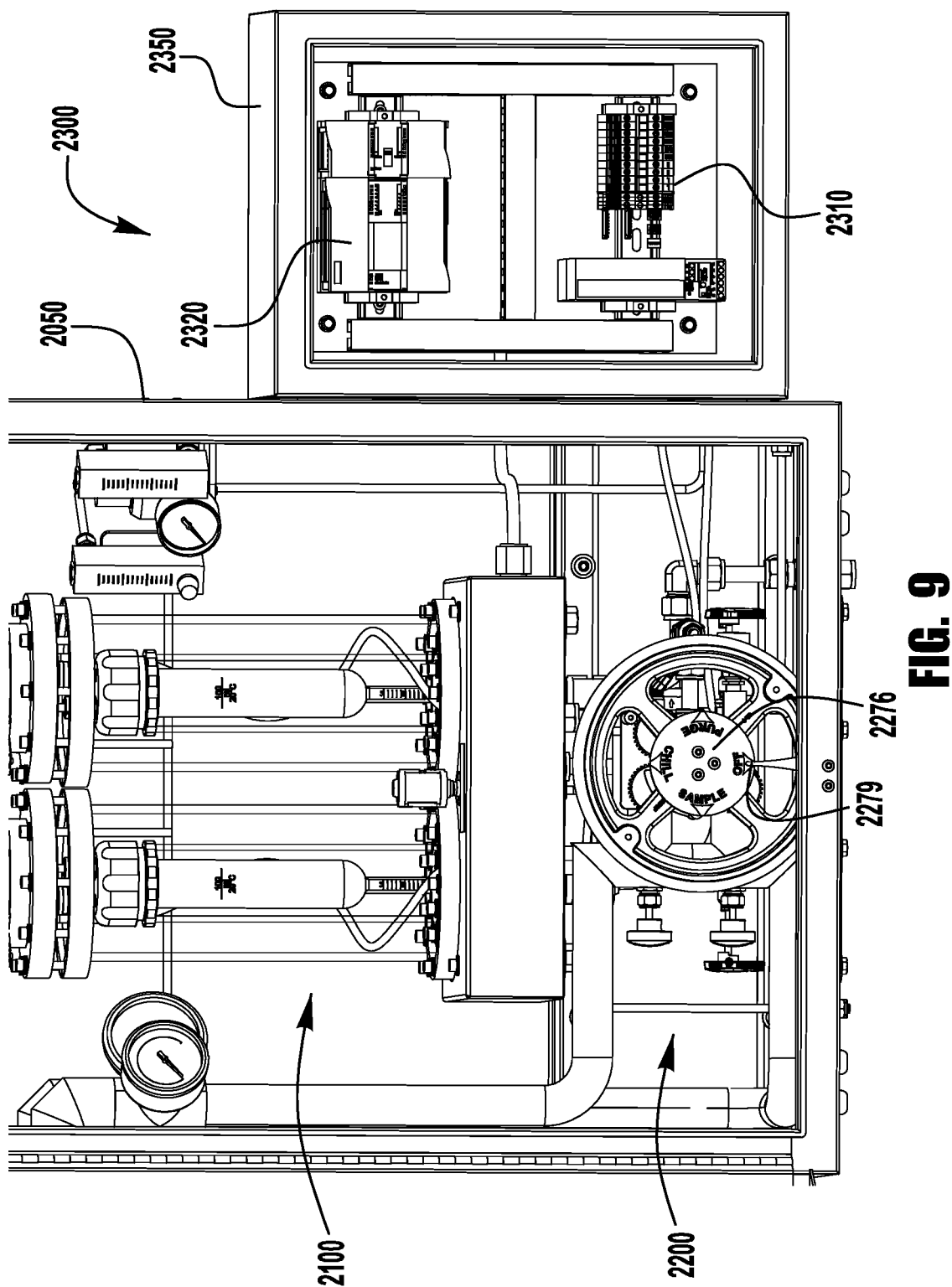
FIG. 9 is a partial front cross-sectional view of the sampling system of FIG. 5, illustrating features of the controller.

FIGS. 5 and 9 illustrate an exemplary controller 2300 of the illustrated embodiment, which includes an enclosure 2350 attached (e.g., welded) to the side of the cabinet 2050. While the enclosure 2300 may be an explosion proof (e.g., heavy-duty cast) enclosure, in some embodiments, the enclosed electrical components may be rated for hazardous areas, allowing for a standard (e.g., 304 stainless steel) enclosure. The enclosure 2350 encloses a microcontroller 2310 with wiring (not shown) electrically connected to the heater block 2104, container temperature probes 2106*a-b*, and fixture block temperature probe 2107. The cabinet 2050 may be provided with conduits plumbed to the interior of the cabinet for enclosing and protecting the wiring. The microcontroller 2310 is connected to a user interface 2320 (e.g., touchscreen and/or button controls) for display of system conditions (e.g., temperature, elapsed time) and/or user input of desired sample collecting and test conditions, for example, chilling and heating temperatures, sample testing durations, etc. In other embodiments, the microcontroller 2310 may additionally or alternatively be configured to communicate wirelessly to a remote device (e.g., computer, smartphone) to display system conditions and/or receive operating inputs. An external power source (e.g., hard-wired with an electrical conduit of an electrical system) may provide power to the controller for powering the heater block and temperature probes.

Figure 10:
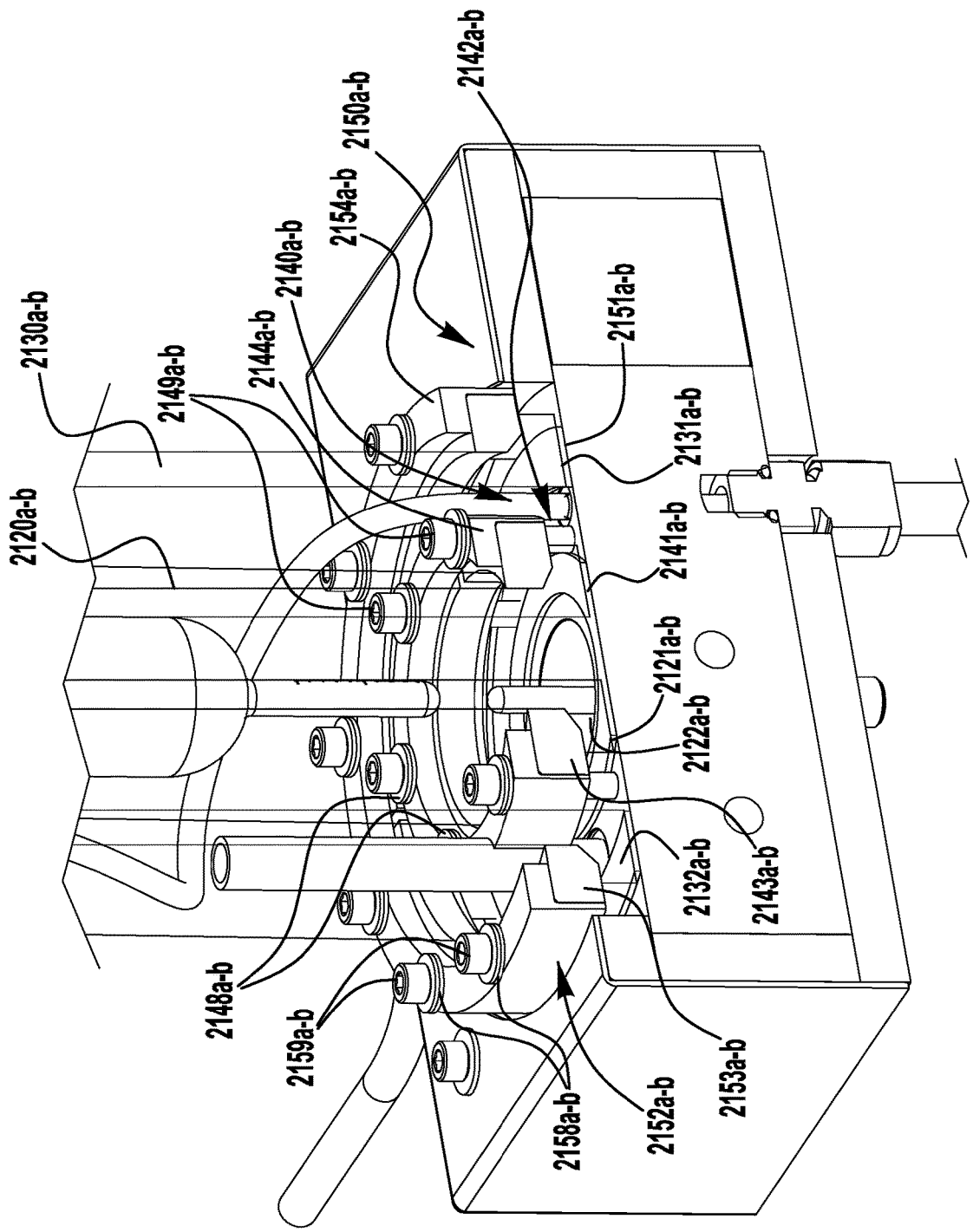
FIG. 10 is a partial side cross-sectional view of the sampling system of FIG. 5, illustrating features of the container mounting arrangements.

FIG. 10 illustrates the exemplary inner and outer mounting arrangements 2140*a-b*, 2150*a-b*. As shown, ring gaskets 2141*a-b*, 2151*a-b* (e.g., 1/16" thick EPDM gasket) may be provided between the bottom surfaces 2121*a-b*, 2131*a-b* of the container pipes and an upper surface of the fixture block. Inner and outer clamp rings 2142*a-b*, 2152*a-b* are tightened against lower flange portions 2122*a-b*, 2132*a-b* of the container pipes by bolts 2149*a-b*, 2159*a-b* installed through holes in the clamp rings and into threaded mounting holes in the fixture block, to compress the ring gaskets between the pipe ends and the fixture block to effect a seal. As shown, the clamp rings may include a plastic (e.g., PVC) flange engaging insert 2143*a-b*, 2153*a-b*, providing loaded elastic engagement between the clamp rings and the pipe flanges, and a metal (e.g., 304 stainless steel) collar 2144*a-b*, 2154*a-b* restricting an outer diameter of the plastic inserts, for example, to restrict radial extrusion of the plastic inserts. Belleville washers 2148*a-b*, 2158*a-b* may be installed on the bolts 2149*a-b*, 2159*a-b* to effect a live-loaded seal.

Figure 11:
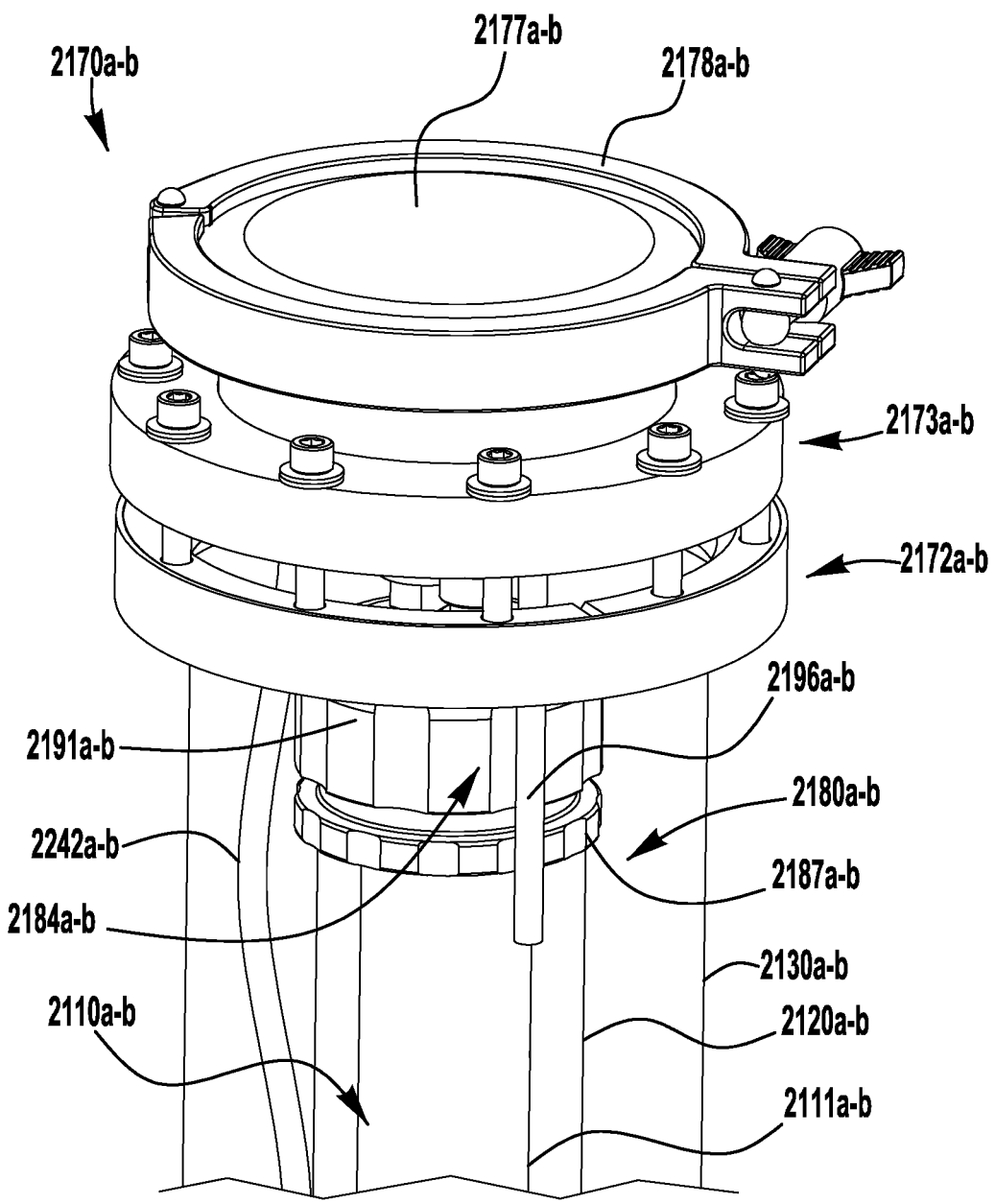
FIG. 11 is an upper perspective view of a container cap subassembly and residue tube cap subassembly of the sampling system of FIG. 5.
Figure 12:
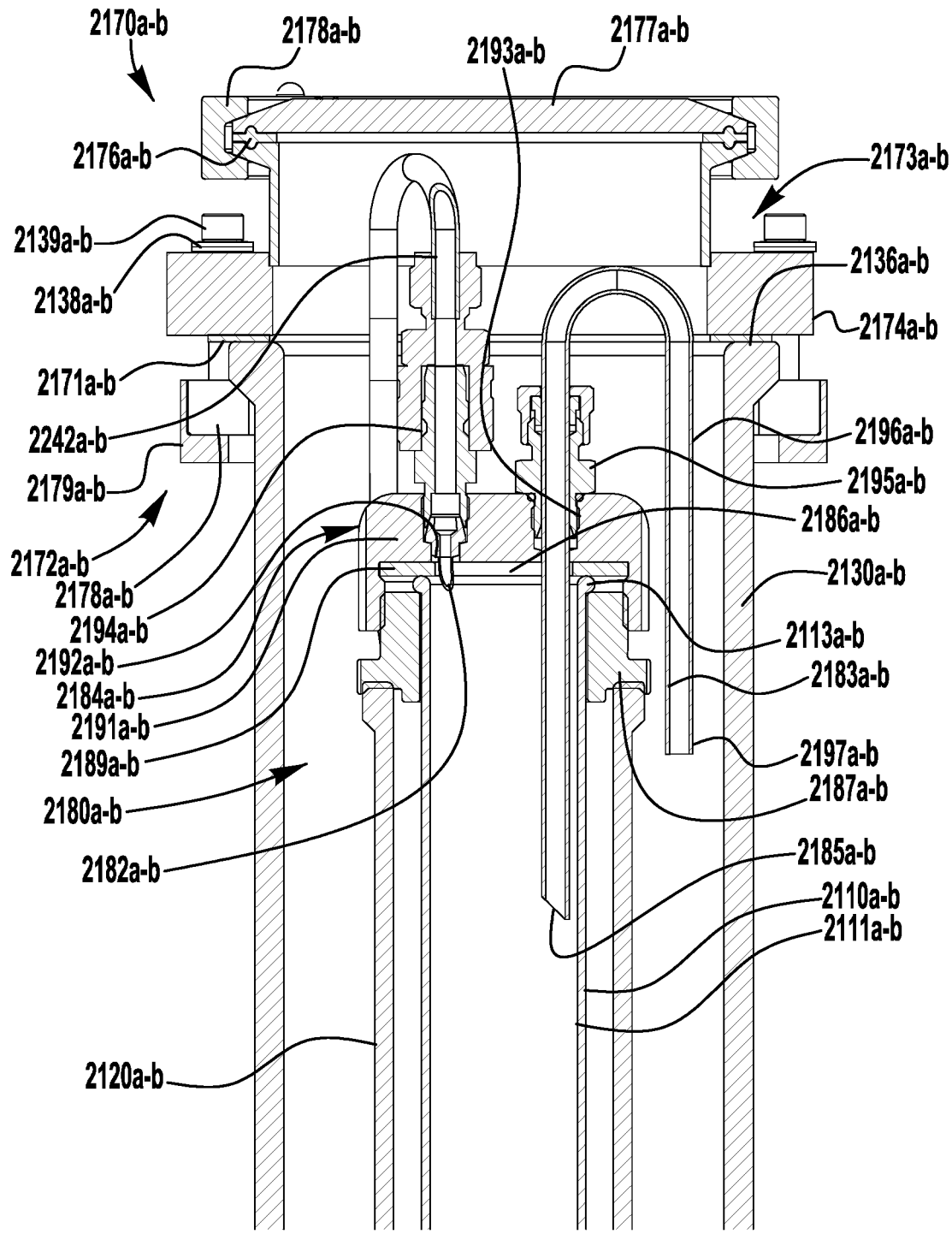
FIG. 12 is a side cross-sectional view of a container cap subassembly and residue tube cap subassembly of the sampling system of FIG. 5.

As shown in FIGS. 11 and 12, the illustrated exemplary container cap subassembly 2170*a-b* includes a ring gasket 2171*a-b*, clamp ring 2172*a-b*, cap ring 2173*a-b*, cap gasket 2176*a-b*, cap 2177*a-b*, and hinged clamp 2178*a-b*. As shown in FIG. 12, the ring gasket 2171*a-b* (e.g., 1/16" thick [material] gasket) is provided between the top surface 2136*a-b* of the outer pipe 2130*a-b* and a lower flange portion 2174*a-b* of the cap ring 2173*a-b*. The cap ring and clamp ring 2172*a-b* are tightened against an upper flange portion 2137*a-b* of the outer pipe by bolts 2139*a-b* installed through holes in the cap ring 2173*a-b* and into threaded mounting holes in the clamp ring 2172*a-b*, to compress the ring gasket between the outer pipe and the cap ring to effect a seal. As shown, the clamp ring 2172*a-b* may include a plastic (e.g., PVC) flange engaging insert 2178*a-b*, providing loaded elastic engagement between the clamp ring and the pipe flange, and a metal (e.g., 304 stainless steel) collar 2179*a-b* restricting an outer diameter of the plastic insert, for example, to restrict radial extrusion of the plastic insert. The cap 2177*a-b* is secured to an upper flanged portion 2175*a-b* of the cap ring 2173*a-b* by the hinged clamp 2178*a-b*, with the cap gasket 2176*a-b* compressed between the upper flanged portion and the cap to provide a leak tight seal. The upper flanged portion 2175*a-b* may be welded to the lower flange portion 2174*a-b* of the cap ring 2173*a-b*. Belleville washers 2138*a-b* may be installed on the bolts to provide a live-loaded seal.

Figure 13:
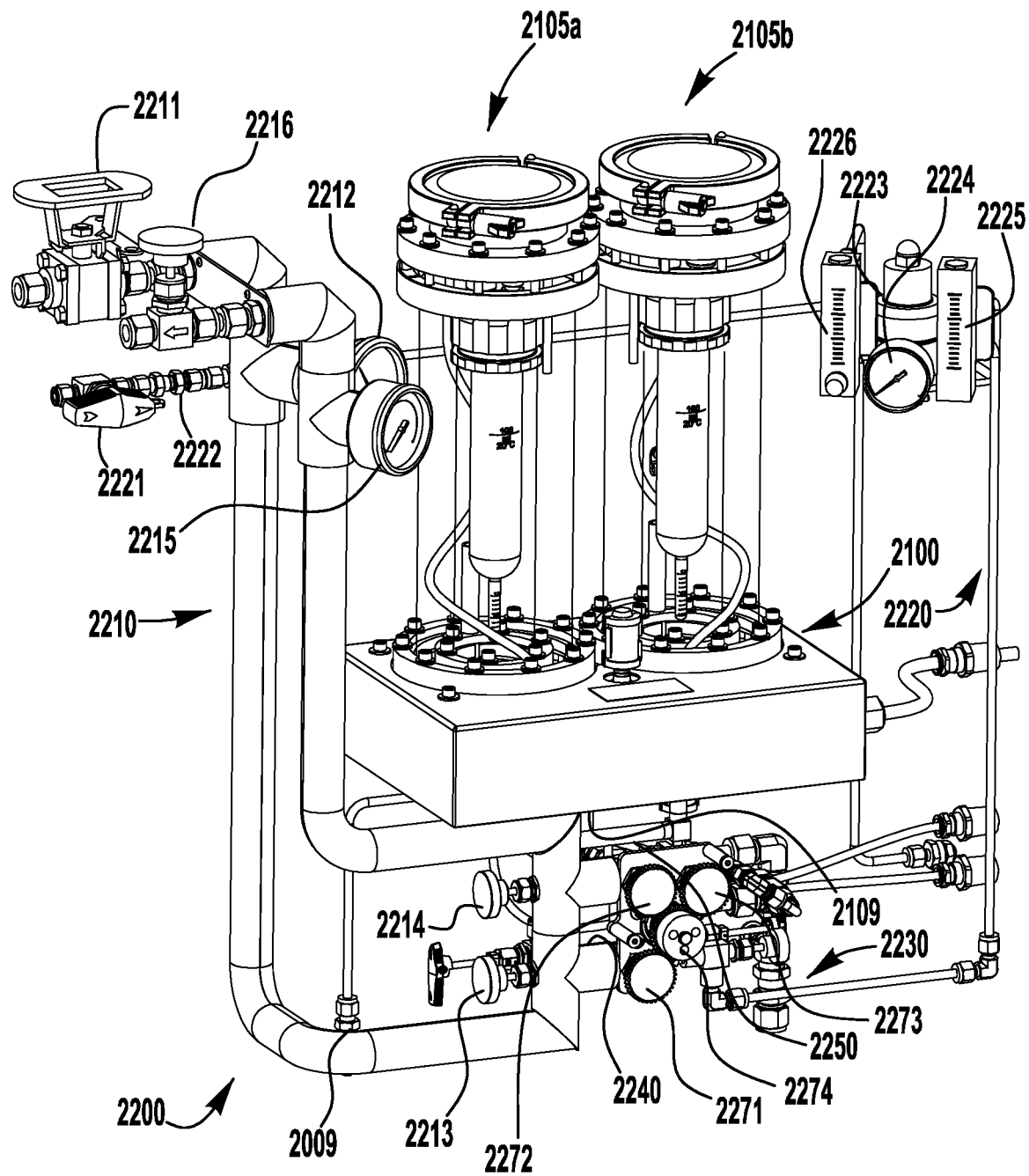
FIG. 13 is a front perspective view of the sampling system of FIG. 5, with portions removed to illustrate additional features of the fluid distribution system.
Figure 14:
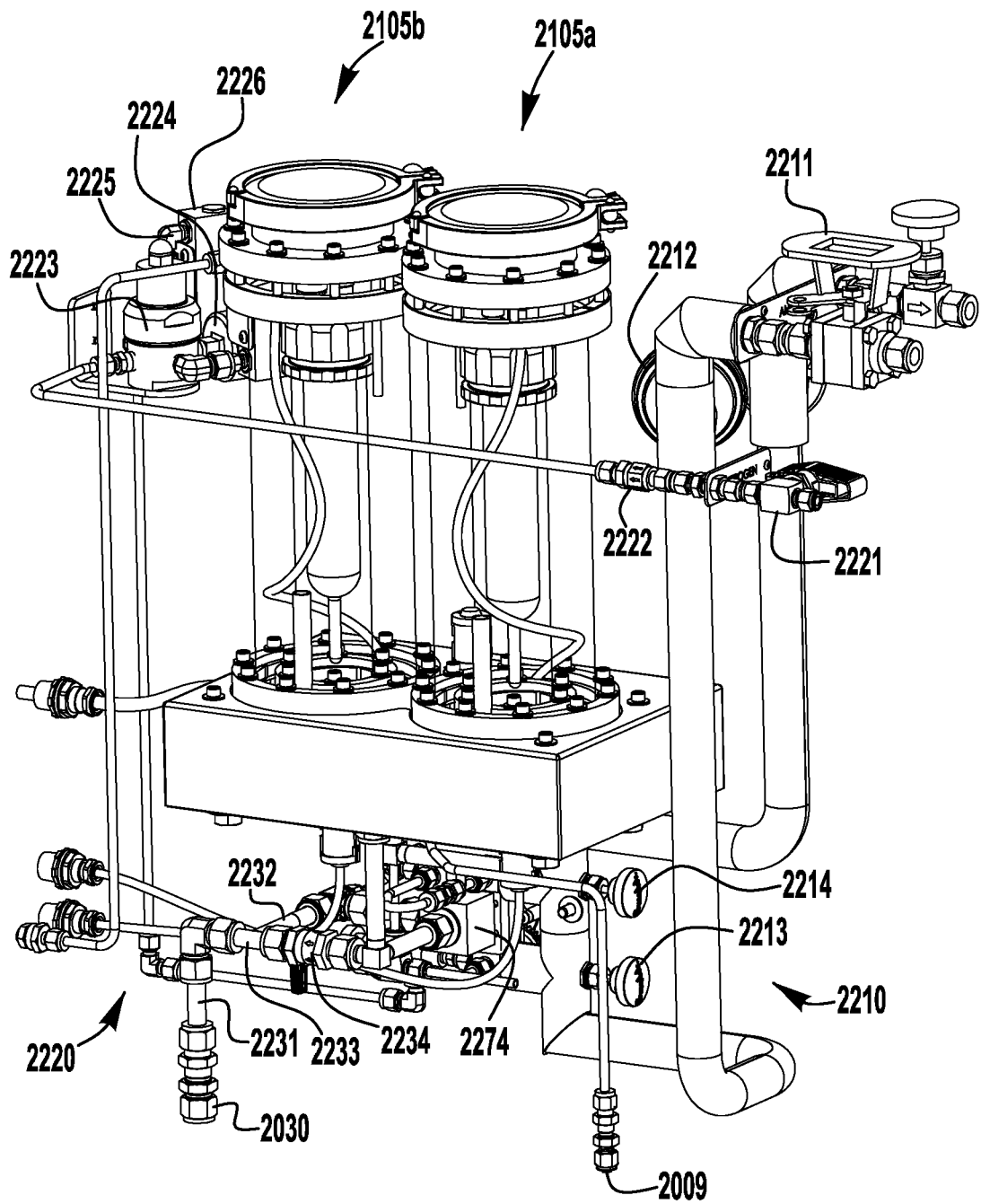
FIG. 14 is a rear perspective view of the sampling system of FIG. 5, with portions removed to illustrate additional features of the fluid distribution system.
Figure 15:
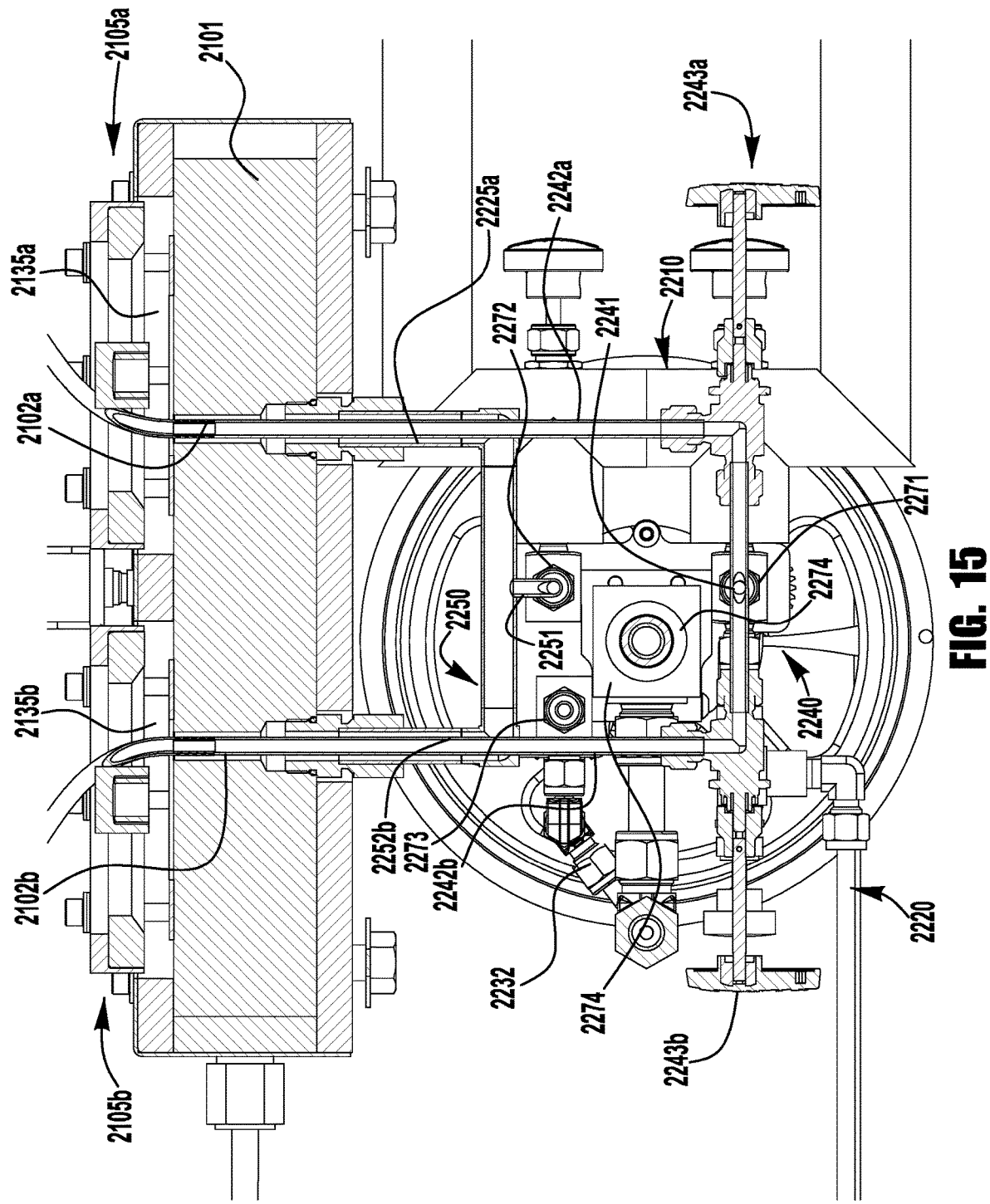
FIG. 15 is a partial rear cross-sectional view of the sampling system of FIG. 5, illustrating residue tube and cold bath lines of the fluid distribution system.

As shown in FIGS. 13-15, the fluid distribution system 2200 includes an ammonia supply line 2210 for supplying ammonia from an ammonia supply (not shown) to the sampling fixture 2100, a purge gas supply line 2220 for supplying purge gas (e.g., nitrogen) to the sampling fixture, a drain line 2230 for draining fluid from the containers, a residue tube line 2240 for supplying ammonia and purge gas to the residue tubes, a cold bath line 2250 for supplying ammonia to, and draining ammonia and purge gas from, the outer annuli, and an overflow line 2260 for draining excess ammonia from the outer annuli.

The ammonia supply line 2210 may be configured to continuously recirculate ammonia in the supply line to the ammonia supply to provide for quicker sampling of the fluid (i.e., a "fast loop" arrangement). As shown, the ammonia supply line 2210 may include a shutoff valve 2211, a temperature indicator 2212, first and second branch valves 2213, 2214, a pressure gauge 2215, and a regulating valve 2216. The shutoff valve 2211 provides for isolation of the system from the ammonia supply, for example, to facilitate system maintenance. The branch valves 2213, 2214 provide for selective and independent flow control to each of the residue tubes and the cold baths, respectively. The regulating valve 2216 may be operated to reduce flow and increase pressure, for example, to ensure the ammonia remains in a liquid state. As shown, the ammonia supply line may be provided with insulation material to minimize heat gain in the recirculating ammonia. In other embodiments (not shown), the temperature indicator and the pressure gauge may be electrically connected to the controller for electronic monitoring of the ammonia supply line temperature and pressure.

The purge gas supply line 2220 may be configured to direct purge gas from a purge gas supply (not shown) to an enclosure purge, for example, to purge stray vapors from the enclosure (both the control enclosure and sampling enclosure) to the surrounding atmosphere. As shown, the purge gas supply line 2220 may include a shutoff valve 2221, a check valve 2222, a pressure regulator 2223, a pressure gauge 2224, a supply flowmeter 2225, and a purge flowmeter 2226. The shutoff valve 2221 provides for isolation of the system from the purge gas supply, for example, to facilitate system maintenance. The check valve 2222 prevents backflow in the purge gas supply line, and the pressure regulator 2223 reduces the purge gas pressure to an appropriate pressure for purging the system (e.g., 10 psig), as monitored by the pressure gauge 2224. In other embodiments (not shown), the pressure gauge and flowmeters may be electrically connected (e.g., wired or wireless connection) to the controller for electronic monitoring of the purge gas supply line pressure and flow rate.

The residue tube line 2240 is connected to the ammonia supply line 2210 and to the purge gas supply line 2220 by a residue tube supply valve 2271 operable to open the residue tube line to a selected one of the ammonia supply line and the purge gas supply line. The residue tube line 2240 includes a source conduit 2241 and branch conduits 2242a-b (a portion of which may include flexible plastic tube, such as Tygon®) each extending through a passage 2102a-b in the fixture block 2101 and into the outer annulus 2135a-b for connection with an inlet port 2192a-b in a sealed cap subassembly 2180a-b of the residue tube 2110a-b, to supply ammonia or purge gas (e.g., nitrogen) to the residue tube. While any suitable arrangement of the source conduit 2241 and branch supply conduits 2242a-b may be utilized, in the illustrated embodiment, the branch conduits extend substantially symmetrically from the central source conduit, for example, to promote consistent, uniform flow to outer annuli of the two containers. As shown in FIG. 15, shutoff valves 2243a-b may be provided with each of the branch conduits 2242a-b to shut off ammonia flow to a selected one of the residue tubes, for example, in the event only one sample is desired.

As shown in FIG. 14, the drain line 2230 includes a drain conduit 2231 extending to a drain 2030 (e.g., a waste disposal system, sewer, or a vessel where the drained ammonia can collect until it warms up and evaporates), an open drain branch 2232 permitting free flow to the drain conduit, and a relief drain branch 2233 permitting pressurized flow to the drain conduit (as limited by a low pressure check valve 2234) for draining fluid from the cold bath line 2250 and the overflow line 2260, as discussed in greater detail below.

The exemplary residue tube cap subassembly 2180a-b, as shown in FIGS. 11 and 12, includes a male threaded sleeve 2187a-b received around the residue tube 2110a-b in abutment with an outer lip 2113a-b at an upper end of the residue tube, and a female threaded cap 2184a-b in threaded engagement with the sleeve to compress a gasket 2189a-b against the upper lip. A bottom end of the sleeve 2187a-b may be configured to extend over or engage a top surface of the inner container pipe 2120a-b to prevent or impede fluid ingress between the outer annulus 2135a-b and the inner cavity 2125a-b.

The cap 2184a-b includes a female threaded cap nut 2191a-b defining an inlet port 2192a-b with an attached inlet connector 2194a-b (e.g., quick-connect coupling) for connection with a branch conduit 2242a-b of a residue tube line 2240, and an outlet port 2193a-b with an attached outlet connector 2195a-b that receives a U-shaped outlet tube 2196a-b defining an outlet passage 2183a-b extending into the residue tube 2110a-b and an overflow passage 2197a-b extending into the outer annulus 2135a-b. As shown, the inlet port 2192a-b in the cap nut 2191a-b may be provided with a necked down flow restriction, for example to provide increased pressure for ensuring the supplied ammonia remains in a liquid state. As shown, the inlet port 2192a-b may include a bent end portion 2182a-b (e.g., tube end, port connector) oriented to direct the flow of fluid from the residue tube line 2240 against the interior wall surface of the residue tube 2110a-b, for example, to minimize disruption to the surface of the fluid in the residue tube, to allow for a more accurate and consistent fill level. While any suitable materials may be used, in an exemplary embodiment, the cap nut and sleeve are provided in PVC.

The vertical position of the outlet tube 2196a-b may be adjusted to adjust the ammonia fill level of the residue tube. In such an embodiment, the outlet tube 2196a-b is adjusted such that the end of the outlet passage 2183a-b is aligned with a desired fill line of the residue tube 2110a-b, such that the outlet passage functions as a dip tube, with excess ammonia flowing up the outlet passage and through the overflow passage 2197a-b to the cold bath in the outer annulus 2135a-b. The overflow passage 2197a-b may extend below the upper end of the inner container pipe 2120a-b to further impede ingress of the ammonia into the inner cavity 2125a-b. The bottom end of the outlet passage 2183a-b may include an angled edge 2185a-b to allow purge gas to be drawn into the outlet passage without carrying liquid ammonia from the surface.

Referring back to FIG. 15, the cold bath line 2250 is connected to the ammonia supply line 2210 by a cold bath supply valve 2272 operable to open the cold bath line to the ammonia supply line. The cold bath line 2250 includes a source conduit 2251 and branch conduits 2252a-b extending to the fixture block 2101 to supply ammonia to a lower end of the outer annulus 2135a-b (thereby providing a cold bath surrounding the heat transfer fluid in the inner cavity 2125a-b). While any suitable arrangement of the source conduit 2251 and branch conduits 2252a-b may be utilized, in the illustrated embodiment, the branch conduits extend substantially symmetrically from the central source conduit 2251, for example, to promote consistent, uniform flow to outer annuli 2135a-b of the two containers 2105a-b. Further, while many different supply passages may be provided, in the illustrated embodiment, the branch conduits 2252a-b surround the residue tube line branch conduits 2242a-b and are connected with the fixture block passages 2102a-b, thereby providing concentric passages for supplying ammonia to the residue tubes and cold baths. This arrangement may facilitate maintaining a sufficiently cold, liquid condition of the ammonia in both lines. The cold bath line 2250 is connected to the open drain branch 2232 of the drain line 2230 by a cold bath drain valve 2273 operable (in combination with the closing of the cold bath supply valve 2272) to drain ammonia and purge gas from the outer annulus 2135a-b.

Figure 16:
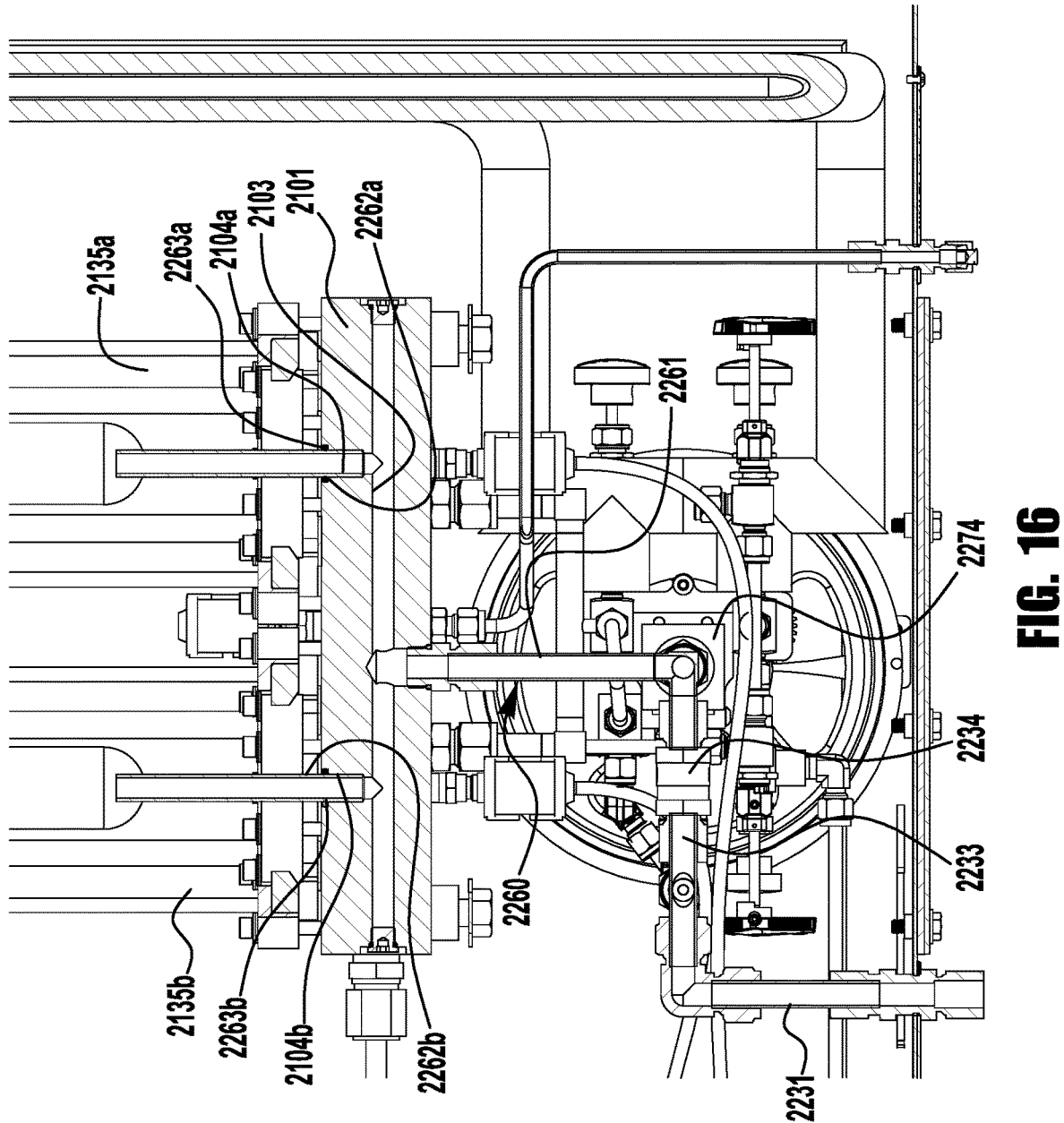
FIG. 16 is a partial rear cross-sectional view of the sampling system of FIG. 5, illustrating overflow and drain lines of the fluid distribution system.

Referring to FIG. 16, the overflow line 2260 is connected to the relief drain branch 2233 of the drain line 2230 for draining ammonia overflow into the outer annulus 2135a-b. The overflow line includes a main conduit 2261 and branch conduits 2262a-b each extending into the outer annulus 2135a-b. While any suitable conduit/porting arrangement may be utilized, in the illustrated embodiment, the main conduit 2261 may be attached (e.g., by a fitting connection) to a branching passage 2103 in the fixture block 2101, with the overflow line branch conduits 2262a-b installed in branch ports 2104a-b of the branching passage 2103. In the illustrated embodiment, O-rings 2263a-b installed in the fixture block branch ports 2104a-b provide for sealing and retention of the overflow line branch conduits (e.g., plastic tubes, such as Tygon®). As shown, the overflow line branch conduits are arranged to terminate at a height selected to limit the volume of the cold bath, with excess ammonia added to the outer annulus 2135a-b draining through the branch conduits to the main conduit 2261, and to the relief drain branch 2233 of the drain line 2230. An overflow drain valve 2274 may be positioned between the relief drain branch 2233 and the open drain branch 2232 and may be selectively closed to block flow from the open drain branch to the overflow line 2260, thereby preventing drain backflow to the overflow line, for example, when the system is inactive.

In an exemplary operation of the sampling system 2000, the residue tube supply valve 2271, cold bath supply valve 2272, cold bath drain valve 2273, and overflow drain valve 2274 (collectively, the "system switching valves") may be collectively operated to place the system in a selected one of an inactive ("OFF") condition, a cold bath filling ("CHILL") condition, a sample filling ("SAMPLE") condition, and a system purging ("PURGE") condition, as described in the embodiment of FIGS. 3-4D above.

Figure 17:
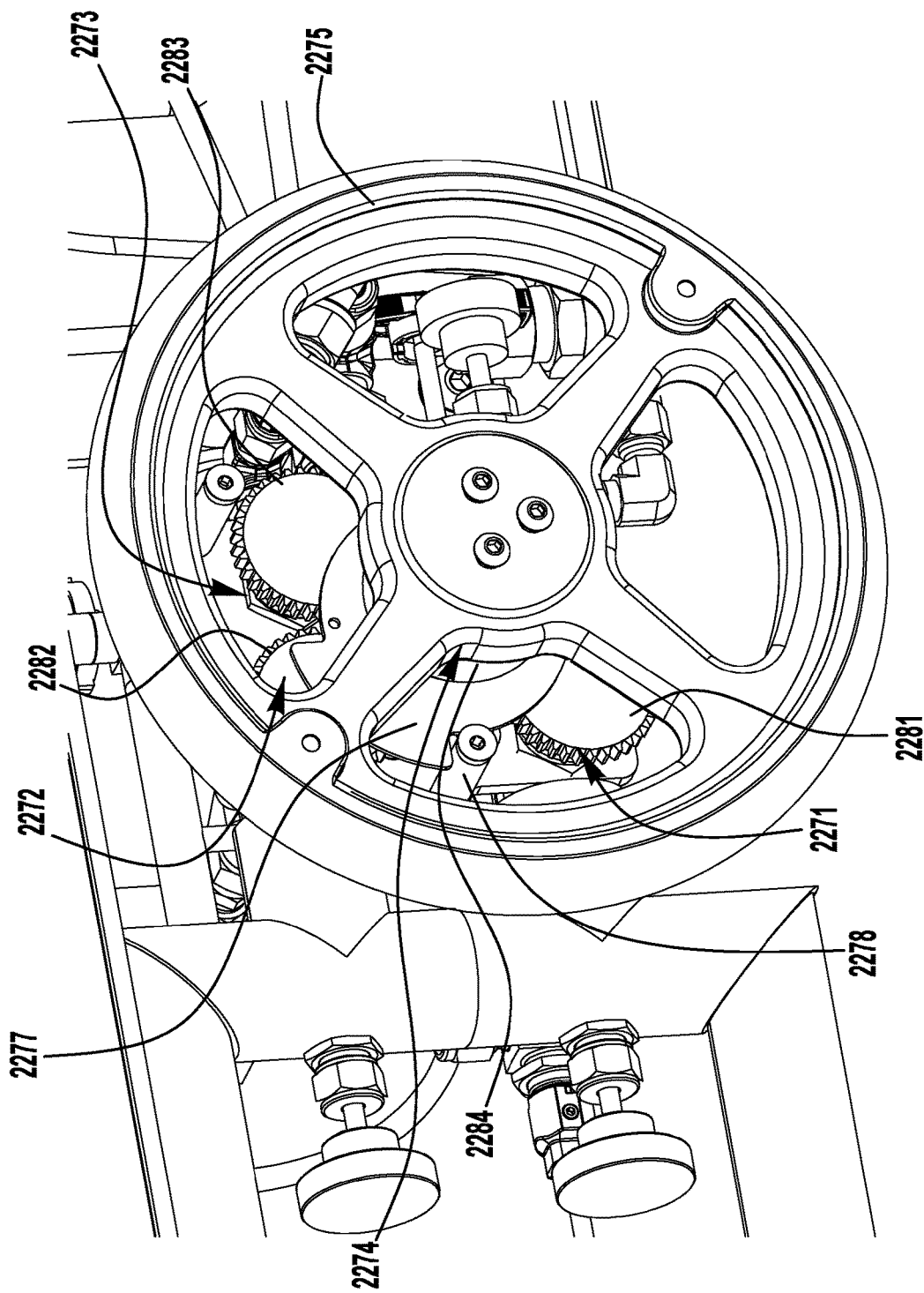
FIG. 17 is a front perspective view of a valve actuation arrangement of the sampling system of FIG. 5.

In the illustrated embodiment, as shown in FIGS. 13 and 17, the system switching valves 2271, 2272, 2273, 2274 are operated by a single handle 2275 for simultaneous actuation of the valves. While many different arrangements may be utilized, in the illustrated example, the wheel-shaped handle 2275 (sized, for example, to provide adequate torque), is directly connected to the overflow drain valve 2274, and by geared arrangements (wheel gears 2281, 2282, 2283, 2284) to the residue tube supply valve 2271, cold bath supply valve 2272, and cold bath drain valve 2273. In such an arrangement, a first rotational position of the handle 2275 corresponds to the inactive ("OFF") condition, a second rotational position corresponds to the cold bath filling ("CHILL") condition, a third rotational position corresponds to the sample filling ("SAMPLE") condition, and a fourth rotational position corresponds to the system purging ("PURGE") condition. While a variety of arrangements may be used to identify the orientation of the handle 2275 (and the corresponding valve conditions), in an exemplary embodiment, as shown in FIG. 5, indicia (e.g., OFF, CHILL, SAMPLE, and PURGE) may be provided on the handle, for example, on an indicator plate 2276 identifying the four handle positions corresponding to the four system conditions. A position marker 2279 (e.g., arrow-shaped tab) may be attached to the cabinet 2050 to align with indicia corresponding to the selected handle position. While the handle may be configured to permit 360° rotation between the four handle positions (e.g., spaced at 90° increments), in other embodiments, the handle 2275 may be configured to be limited, for example, to 270° rotation between the four handle positions, for example, blocking rotation from the "OFF" position to the "SAMPLE" position, and vice versa.

In the illustrated embodiment, as shown in FIG. 17, a cam plate 2277 is secured to the handle 2275, with a first edge of the cam plate engaging a stop pin 2278 (secured to the cabinet 2050) in the "OFF" position of the handle, and a second edge of the cam plate engaging the stop pin in the "SAMPLE" position. Additionally or alternatively, the valve handle arrangement may be provided with detents corresponding to each of the four conditions of the system switching valves, to facilitate user operation of the handle to these positions. In the illustrated embodiment, the cam plate 2277 may be provided with holes or other such recesses that align with a ball detent with the valve handle 2275 is in the "CHILL" and "PURGE" positions to provide a tactile detect condition at these intermediary positions.

In operation, the switching handle 2275 is actuated from the inactive ("OFF") position to the cold bath filling ("CHILL") position to supply ammonia to a cold bath in the outer annulus 2135a-b of each container 2105a-b, and the temperature of the heat transfer fluid is monitored using the temperature probe 2106a-b. Once the heat transfer fluid has reached a desired chilled temperature (e.g., about −10° F. to 10° F. or about −23° C. to −12° C.), the switching handle 2275 is actuated to the sample filling ("SAMPLE") position, in which ammonia is supplied to the residue tube 2110a-b (for collecting the samples) and to the outer annulus 2135a-b (for maintaining a chilled liquid ammonia cold bath). Once the residue tube 2110a-b has been filled to the fill line, coinciding with the lower end of the outlet passage 2183a-b (e.g., as visually identified by the operator or when excess ammonia is passing through the overflow passage 2197a-b), the switching handle 2275 is actuated to the system purging ("PURGE") position, in which the cold bath ammonia is drained from the outer annulus 2135a-b, as facilitated by the purge gas supplied to the residue tube cap subassembly 2180a-b and through the outlet tube 2196a-b. The heater block 2104 is operated to heat the fixture block 2101 (e.g., to about 140° F. or 60° C.), for example, by user operation of the user interface 2320 on the controller 2300, which heats the heat transfer fluid to a desired temperature sufficient to boil off the ammonia but not the water content in the liquid ammonia (e.g., 120° F. or 49° C., per CGA G-2.2). The controller 2300 may be configured to heat the heat transfer fluid to the desired temperature, as monitored by the container temperature probes 2106a-b, and then maintaining the heat transfer fluid at this temperature for a time period selected to ensure boiling of all ammonia in the sample (e.g., 10 minutes, per CGA G-2.2). The controller may provide an alert (e.g., audible and/or visual, or an electrical signal to a remote device) to the operator to visually inspects the residue tube to measure the amount of water in the graduated lower stem portion 2112a-b of the residue tube. After this measurement, the switching handle 2275 is actuated to the inactive ("OFF") position, shutting off the supply of purge gas to the residue tube supply line. The residue tube 2110a-b may then be removed from the container 2105a-b, by releasing the hinged clamp 2178a-b, removing the cap 2177a-b, disconnecting the residue tube line branch conduit 2242a-b from the inlet connector 2194a-b, and withdrawing the capped residue tube from the container. The water may then be removed from the residue tube 2210a-b before reinstalling the residue tube in the container.

Figure 18:
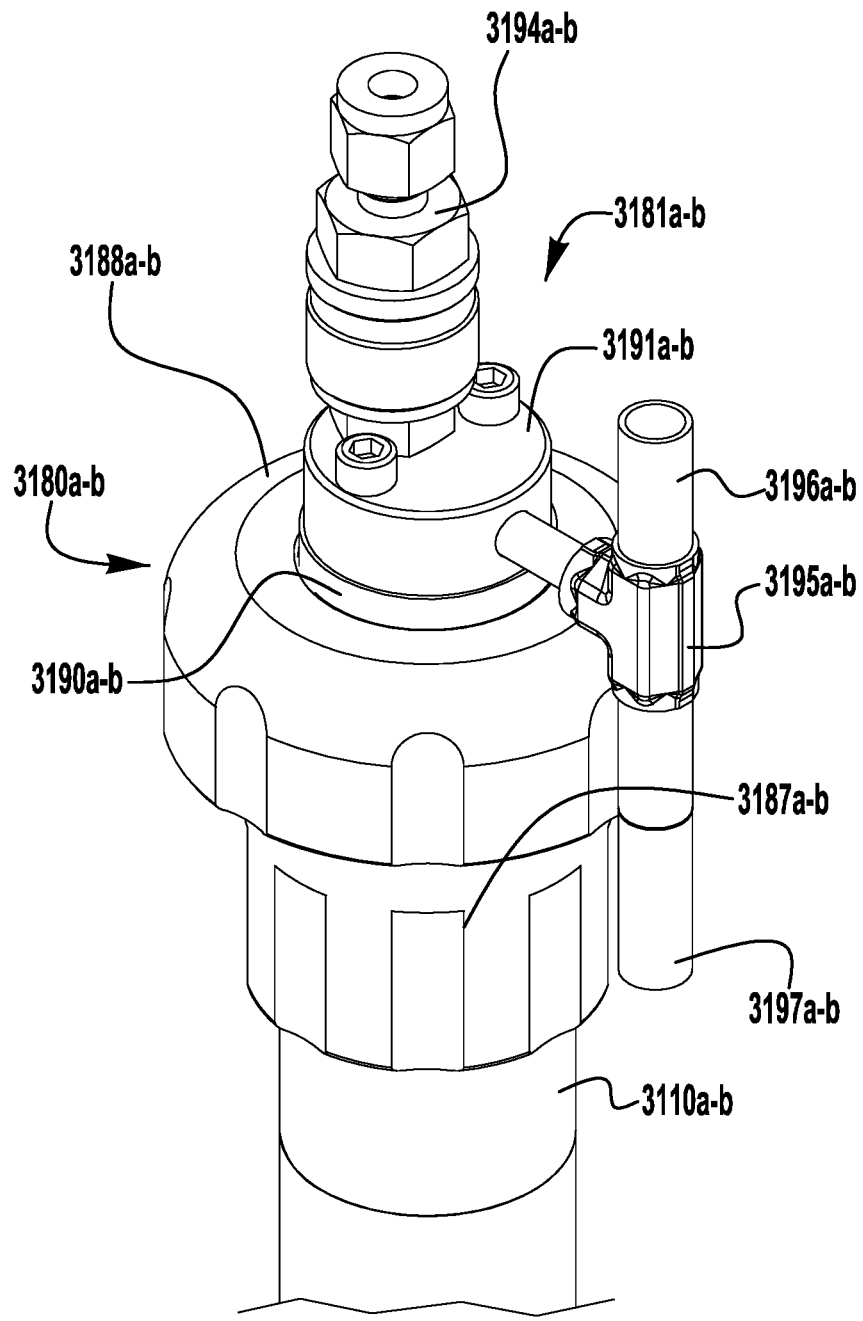
FIG. 18 is a perspective view of a residue tube cap subassembly, in accordance with an exemplary embodiment of the present disclosure.
Figure 19:
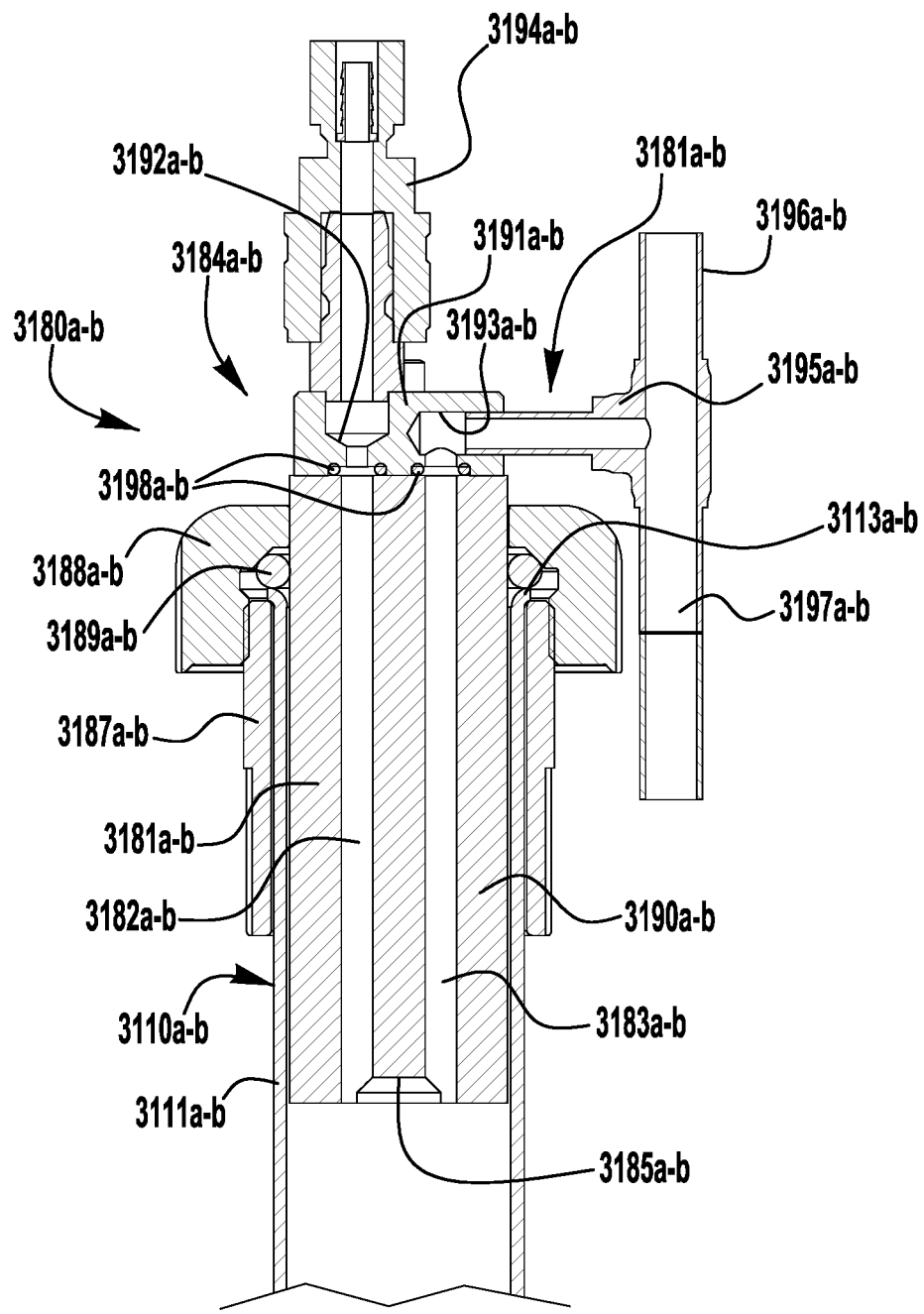
FIG. 19 is a side cross-sectional view of the residue tube cap subassembly of FIG. 18.

FIGS. 18 and 19 illustrate an alternative arrangement for a residue tube cap subassembly 3180a-b including a male threaded sleeve 3187a-b received around the residue tube in abutment with an outer lip 3113a-b at an upper end of the residue tube, and a female threaded cap 3184a-b assembled with the sleeve. The cap 3184a-b includes a female threaded nut 3188*a-b* in threaded engagement with an upper portion of the sleeve 3187*a-b*, and a ported plug 3181*a-b* extending through the nut and received in the upper body portion 3111*a-b* of the residue tube 3110*a-b*. An O-ring 3189*a-b* (or other gasket seal) is clamped between the nut 3188*a-b* and the residue tube lip 3113*a-b* for sealing engagement between the residue tube and the plug 3181*a-b*. A bottom end of the nut 3188*a-b* may be configured to extend over or engage a top surface of the inner container pipe (not shown) to prevent or impede fluid ingress between the outer annulus and the inner cavity.

The exemplary ported plug 3181*a-b* includes an adapter plate 3191*a-b* assembled with a plug body 3190*a-b*, for example, by threaded fasteners 3186*a-b*. In other embodiments, the adapter portion may be welded to or integral with the body of the ported plug. The adapter plate 3191*a-b* includes an inlet port 3192*a-b* aligned with an inlet passage 3182*a-b* of the ported plug, and an outlet port 3193*a-b* aligned with an outlet passage 3183*a-b* of the ported plug, with O-ring seals 3198*a-b* between the inlet/outlet ports and the inlet/outlet passages. An inlet connector 3194*a-b* (e.g., quick-connect coupling) is attached to the inlet port 3192*a-b* (e.g., welded) for connection with the branch conduit of the residue tube line, as described above. An outlet connector 3195*a-b* is attached to the outlet port 3193*a-b* (e.g., welded), and includes upward and downward oriented branch ports 3196*a-b*, 3197*a-b*. As shown, the inlet port 3192*a-b* in the adapter plate 3191*a-b* may be provided with a necked down flow restriction, for example to provide increased pressure for ensuring the supplied ammonia remains in a liquid state. Similar necked down restrictions may additionally or alternatively be provided in the inlet passage of the ported plug. While any suitable materials may be used, in an exemplary embodiment, the plug, sleeve, and nut are provided in PVC, and the cap is provided in stainless steel.

According to an exemplary aspect of the present disclosure, the vertical position of the ported plug 3181*a-b* may be adjusted in the residue tube 3110*a-b* to adjust the ammonia fill level of the residue tube. In such an embodiment, the ported plug is adjusted such that a bottom surface of the plug is aligned with a desired fill line of the residue tube, such that the outlet passage 3183*a-b* functions as a dip tube, with excess ammonia flowing up the outlet passage and through the downward oriented branch port 3197*a-b* to the cold bath in the outer annulus. The downward oriented branch port may extend below the upper end of the inner container pipe to further impede ingress of the ammonia into the inner cavity. The bottom surface of the plug 3181*a-b* may include a channel 3185*a-b* extending between the inlet and outlet passages 3182*a-b*, 3183*a-b*, to allow purge gas to pass to the outlet passage without carrying liquid ammonia from the surface.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A residue tube assembly comprising:
    a residue tube including an open upper end; and
    a cap assembly including a cap sealingly secured with the open upper end and an outlet tube installed through an opening in the cap and adjustably secured through a coupling assembled with the cap, the outlet tube defining an outlet passage extending into the residue tube to define a fill limit of the residue tube, and an overflow passage extending radially outward and downward of the open upper end of the residue tube;
    wherein the outlet tube is vertically adjustable in the cap to adjust the fill limit of the residue tube.

2. The residue tube assembly of claim 1, further comprising a male threaded sleeve received around the residue tube in abutment with an outer lip at the open upper end of the residue tube, wherein the cap includes a female threaded outer peripheral wall in threaded engagement with the sleeve to compress a gasket against the outer lip of the residue tube.

3. The residue tube assembly of claim 1, wherein the outlet passage includes an edge surface extending at an angle from horizontal.

4. The residue tube assembly of claim 1, wherein the cap further includes an inlet passage extending through the cap.

5. The residue tube assembly of claim 4, wherein the inlet passage comprises an inlet tube installed through an opening in the cap.

6. The residue tube assembly of claim 5, wherein the inlet tube includes a bent end portion oriented to direct fluid flow against an interior wall surface of the residue tube.

7. A sampling container assembly comprising:
    a residue tube including an open upper end;
    a pipe surrounding the residue tube to define an inner cavity for receiving a heat transfer fluid; and
    a cap assembly sealingly secured with the open upper end of the residue tube, and defining an outlet passage extending into the residue tube to define a fill limit of the residue tube, and an overflow passage extending radially outward and downward of open upper end of the residue tube, the cap assembly comprising:
        a male threaded sleeve received around the residue tube in abutment with an outer lip at the open upper end of the residue tube; and
        a female threaded cap in threaded engagement with the sleeve to compress a gasket against the outer lip of the residue tube.

8. The sampling container assembly of claim 7, further comprising an adjustable member assembled with the cap, the adjustable member having a first portion defining the outlet passage and a second portion defining the overflow passage.

9. The sampling container assembly of claim 8, wherein the adjustable member comprises an outlet tube installed through an opening in the cap.

10. The sampling container assembly of claim 9, wherein the outlet tube is adjustably secured through a coupling assembled with the cap.

11. The sampling container assembly of claim 7, wherein the male threaded sleeve includes an overhang portion that extends over an upper end of the pipe.

12. A sampling container assembly comprising:
    a residue tube including an open upper end;
    an inner pipe surrounding the residue tube to define an inner cavity for receiving a heat transfer fluid;
    an outer pipe surrounding the inner pipe to define an outer annulus; and
    a cap assembly sealingly secured with the open upper end of the residue tube and defining an outlet passage extending into the residue tube to define a fill limit of the residue tube, and an overflow passage extending radially outward and downward of the open upper end of the residue tube, into the outer annulus between the inner pipe and the outer pipe.

13. The sampling container assembly of claim 12, wherein the cap assembly comprises a cap extending over the open upper end of the residue tube and an adjustable member assembled with the cap, the adjustable member having a first portion defining the outlet passage and a second portion defining the overflow passage.

14. The sampling container assembly of claim 13, wherein the adjustable member comprises an outlet tube installed through an opening in the cap.

15. The sampling container assembly of claim 13, wherein the cap assembly further comprises a male threaded sleeve received around the residue tube in abutment with an outer lip at the open upper end of the residue tube, wherein the cap includes a female threaded outer peripheral wall in threaded engagement with the sleeve to compress a gasket against the outer lip of the residue tube.

16. The sampling container assembly of claim 12, further comprising a supply conduit extending through the outer annulus and connected with an inlet port of the residue tube cap assembly for providing a sample fluid to the residue tube.

17. The sampling container assembly of claim 16, wherein the inlet port includes a necked down flow restriction.

* * * * *